United States Patent
Nam et al.

(10) Patent No.: US 11,146,958 B2
(45) Date of Patent: Oct. 12, 2021

(54) METHOD AND ELECTRONIC DEVICE FOR PERFORMING WIRELESS COMMUNICATION BY USING CHANNEL LIST

(71) Applicant: Samsung Electronics Co., Ltd., Gyeonggi-do (KR)

(72) Inventors: Choun-Jong Nam, Gyeonggi-do (KR); Nalli Subramanyami, Gyeonggi-do (KR); Jung-Hun Lee, Gyeonggi-do (KR); Doo-Suk Kang, Gyeonggi-do (KR); Hyun-Kee Min, Gyeongsangbuk-do (KR); Tae-Hun Lim, Gyeonggi-do (KR); Min-Whoa Hong, Gyeonggi-do (KR); Sun-Key Lee, Gyeonggi-do (KR); Bo-Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/491,733

(22) PCT Filed: Mar. 6, 2018

(86) PCT No.: PCT/KR2018/002674
§ 371 (c)(1),
(2) Date: Sep. 6, 2019

(87) PCT Pub. No.: WO2018/164466
PCT Pub. Date: Sep. 13, 2018

(65) Prior Publication Data
US 2020/0015140 A1 Jan. 9, 2020

(30) Foreign Application Priority Data
Mar. 7, 2017 (KR) .................. 10-2017-0029071

(51) Int. Cl.
*H04W 12/08* (2021.01)
*H04B 17/318* (2015.01)
(Continued)

(52) U.S. Cl.
CPC .......... *H04W 12/08* (2013.01); *H04B 17/318* (2015.01); *H04W 12/06* (2013.01);
(Continued)

(58) Field of Classification Search
CPC . H04W 12/08; H04W 36/0085; H04W 12/06; H04W 36/0072; H04W 36/08; H04W 36/30; H04W 84/12; H04B 17/318
See application file for complete search history.

(56) References Cited

U.S. PATENT DOCUMENTS

2008/0075035 A1    3/2008  Eichenberger
2009/0221287 A1*   9/2009  Balasubramanian ........................
                                             H04W 84/045
                                             455/434

(Continued)

FOREIGN PATENT DOCUMENTS

KR    10-2010-0132013 A    12/2010
KR    10-2013-0137412 A    12/2013
(Continued)

OTHER PUBLICATIONS

Korean Search Report dated Mar. 12, 2021.

*Primary Examiner* — Chi H Pham
*Assistant Examiner* — Ji-Hae Yea
(74) *Attorney, Agent, or Firm* — Cha & Reiter, LLC

(57) ABSTRACT

An electronic device according to one embodiment comprises: a housing; a wireless communication circuit located in the housing, and supporting a wireless protocol so as to wirelessly connect to one of a plurality of APs using the same first credential information at one time point; a pro-
(Continued)

cessor located in the housing and electrically connected to the communication circuit; and a memory located in the housing and electrically connected to the processor. The electronic device receives, from a first AP, a list of first channels at least partially associated with at least one second AP having a coverage overlapping a coverage of the first AP and a list of second channels associated with at least one third AP that does not have a coverage overlapping the coverage of the first AP through the wireless communication circuit, wherein the first AP, the at least one second AP, and the at least one third AP use the identical first credential information.

13 Claims, 29 Drawing Sheets

(51) Int. Cl.
*H04W 36/00* (2009.01)
*H04W 12/06* (2021.01)
*H04W 36/08* (2009.01)
*H04W 36/30* (2009.01)
*H04W 84/12* (2009.01)

(52) U.S. Cl.
CPC ... *H04W 36/0072* (2013.01); *H04W 36/0085* (2018.08); *H04W 36/08* (2013.01); *H04W 36/30* (2013.01); *H04W 84/12* (2013.01)

(56) References Cited

U.S. PATENT DOCUMENTS

| | | | |
|---|---|---|---|
| 2015/0139032 A1* | 5/2015 | Ko | H04W 48/16 370/254 |
| 2015/0222447 A1* | 8/2015 | Park | H04W 48/16 370/312 |
| 2015/0382262 A1 | 12/2015 | Cho et al. | |
| 2016/0198326 A1* | 7/2016 | Shmidt | H04W 4/80 455/434 |

FOREIGN PATENT DOCUMENTS

| | | | | |
|---|---|---|---|---|
| KR | 10-2014-0010206 A | 1/2014 | | |
| KR | 10-2016-0001084 A | 1/2016 | | |
| WO | 2013/183953 A1 | 12/2013 | | |
| WO | WO-2013183953 A1 * | 12/2013 | ............ | H04W 48/16 |
| WO | 2014/010883 A1 | 1/2014 | | |
| WO | 2015/069173 A1 | 5/2015 | | |

* cited by examiner

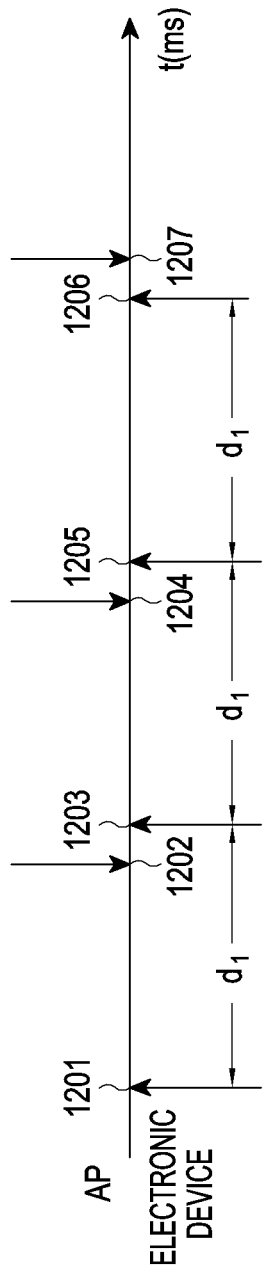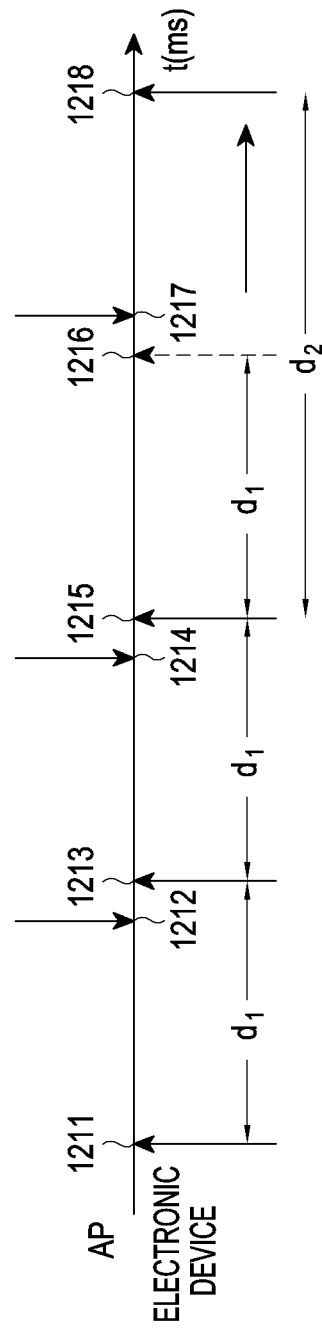

METHOD AND ELECTRONIC DEVICE FOR PERFORMING WIRELESS COMMUNICATION BY USING CHANNEL LIST

CROSS REFERENCE TO RELATED APPLICATIONS

This application is a National Phase Entry of PCT International Application No. PCT/KR2018/002674, which was filed on Mar. 6, 2018, and claims a priority to Korean Patent Application No. 10-2017-0029071, which was filed on Mar. 7, 2017, the contents of which are incorporated herein by reference.

TECHNICAL FIELD

Various embodiments of the present disclosure relate to an electronic device that performs wireless communication.

BACKGROUND ART

Recently, electronic devices have been able to provide various functions such as video communication, digital media broadcasting (DMB), audio or video streaming, Internet, etc., as well as voice communication. Such various functions provided by the electronic device are provided through connection with a network over a mobile communication network or through connection with a network via an access point (AP) that is a wireless repeater according to a wireless communication scheme such as Wireless Fidelity (WiFi), Wireless Broadband (WiBro), etc.

When the electronic device is connected with the network through the AP according to the wireless communication scheme such as WiFi, WiBro, etc., a coverage of the AP capable of performing wireless communication is limited, such that even when the electronic device moves, the electronic device may perform continuous wireless communication by performing roaming to another AP from the currently connected AP.

DETAILED DESCRIPTION OF THE INVENTION

Technical Problem

As the electronic device moves, the electronic device may perform scanning to perform roaming to another AP. The electronic device may not be aware of information about all channels associated with APs to which the electronic device may currently roam, and thus a time required for the electronic device to scan an AP to which the electronic device is to roam increases, incurring additional electric current consumption.

Various embodiments of the present disclosure provide an electronic device to solve the foregoing or other problems.

Technical Solution

According to various embodiments of the present disclosure, an electronic device includes a housing, a wireless communication circuit located inside the housing and configured to support a wireless protocol for a wireless connection, at a time point, with one of a plurality of access points (APs) that use identical first credential information, a processor located inside the housing and electrically connected with the wireless communication circuit, and a memory located inside the housing and electrically connected with the processor, in which the memory stores instructions that cause, when executed, the processor to wirelessly connect to a first AP by using the first credential information, through the wireless communication circuit, to receive a list of first channels at least partially associated with at least one second AP having a coverage overlapping a coverage of the first AP among the plurality of APs, through the wireless communication circuit, and to perform scanning with respect to the at least one second AP that uses the first credential information by using the list of the first channels, through the wireless communication circuit, in which the list of the first channels includes, but not all, a plurality of channels among channels available from the wireless protocol.

According to various embodiments of the present disclosure, in a non-transitory computer-readable recording medium having recorded thereon a program to be executed on a computer, the program includes executable instructions that cause, when executed by a processor, the processor to wirelessly connect to a first AP by using first credential information, to receive at a time point, a list of first channels at least partially associated with at least one second AP having a coverage overlapping a coverage of the first AP among the plurality of APs, and to perform scanning with respect to the at least one second AP that uses the first credential information by using the list of the first channels, in which the list of the first channels includes, but not all, a plurality of channels among channels available from the wireless protocol.

According to various embodiments of the present disclosure, an electronic device includes a housing and a wireless communication circuit located inside the housing and configured to support a wireless protocol as a first AP, in which the wireless communication circuit is configured to store a list of first channels associated with at least one other AP having a coverage overlapping a coverage of the first AP, the list of the first channels including, but not all, a plurality of channels among channels available from the wireless protocol, to wirelessly connect to an external electronic device as the first AP by using first credential information, and to provide the list of the first channels to the external electronic device.

Advantageous Effects

The electronic device according to various embodiments of the present disclosure may receive from a wireless-communication-connected AP, a channel list associated with APs to which the electronic device may currently roam, and may scan an AP to which the electronic device is to roam, by using the channel list. Therefore, a time required for the electronic device to scan an AP to which the electronic device is to roam may be reduced, and additional electric current consumption may be prevented.

BRIEF DESCRIPTION OF DRAWINGS

FIGS. 12A through 12C are views for describing adjustment of a dwell time by an electronic device, according to various embodiments of the present disclosure.

MODE FOR CARRYING OUT THE INVENTION

Figure 1:
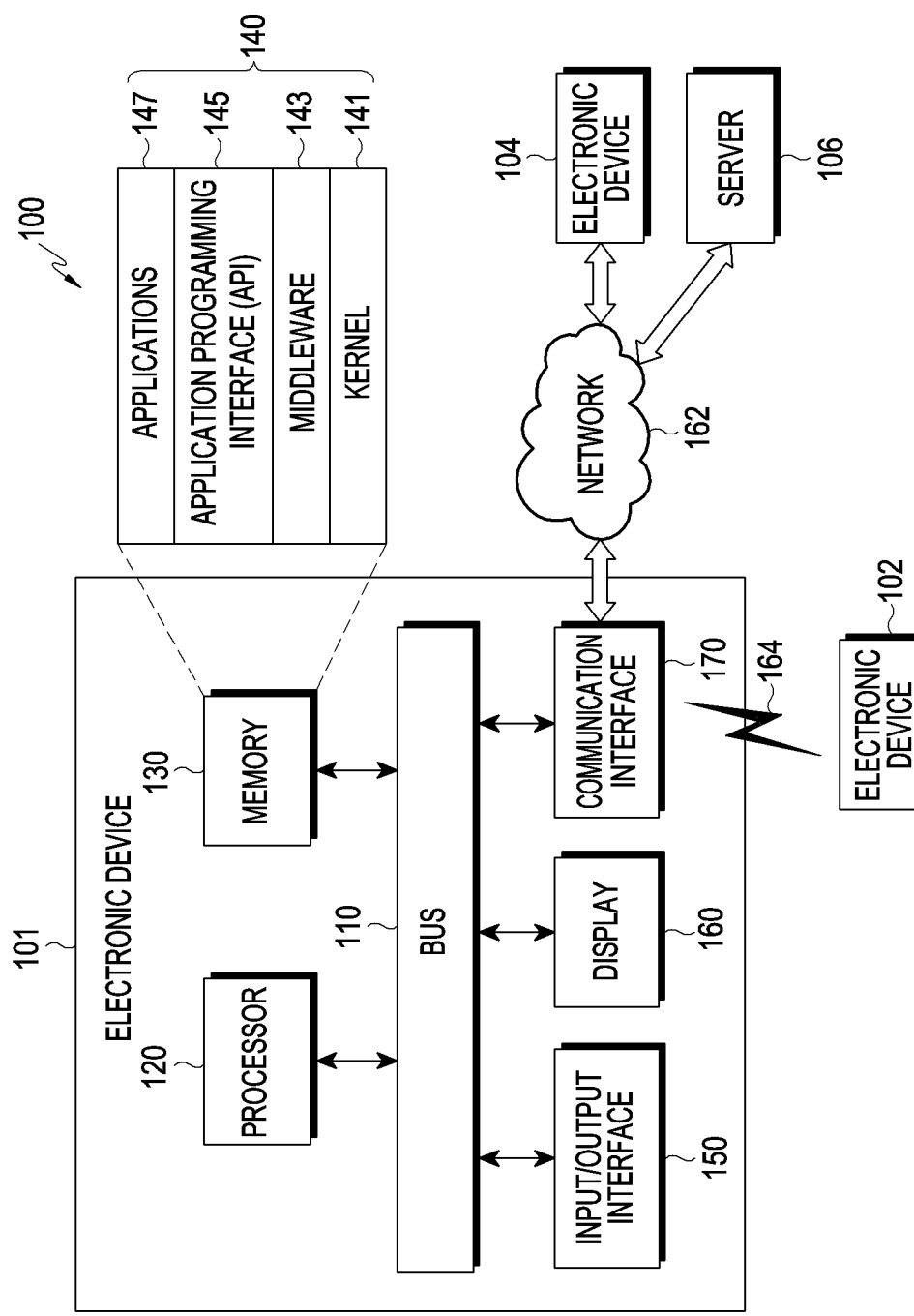
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured (or designated) to" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or designated) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, or a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implantable circuit, or the like. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic frame.

In other embodiments, the electronic device may include at least one of various medical equipment (e.g., various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 may perform operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., the vehicle device 102, the electronic device 104, or the server 106). For example, the communication interface 170 may be connected to a network 162 through a wireless communication or wired communication to communicate with an external device (e.g., the second external electronic device 104 or the server 106).

The wireless communication may include cellular communication using at least one of Long-Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Light Fidelity (LiFi), Bluetooth, Bluetooth Low Energy (BLE), Zigbee, near field communication (NFC), magnetic secure transmission (MST), radio frequency (RF), and a body area network (BAN), as illustrated as an element 164 in FIG. 1. According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), or Galileo, the European global satellite-based navigation system. Hereinbelow, "GPS" may be used interchangeably with "GNSS". The wired communication may include, for example, at least one of a universal serial bus (USB), a high definition multimedia interface (HDMI), Recommended Standard 232 (RS-232), power line communication, a plain old telephone service (POTS), or the like. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

According to various embodiments of the present disclosure, elements included in the electronic device 101 illustrated in FIG. 1 may be arranged inside a housing of the electronic device 101. The elements included in the electronic device 101 may be electrically connected with one another.

According to various embodiments of the present disclosure, a wireless communication circuit (e.g., the communication interface 170) may support a wireless protocol so as to be wirelessly connected to one of a plurality of APs using identical credential information. The wireless protocol may include protocols based on various communication schemes, e.g., a WiFi protocol, etc.

According to various embodiments of the present disclosure, the credential information may be used for wireless communication connection or AP scanning and may include at least one of security information such as a service set identifier (SSID), a password, etc.

According to various embodiments of the present disclosure, the memory 130 may include instructions for operating the processor 120. For example, the memory 130 may include instructions for causing the processor 120 to control other elements of the electronic device 101 and to interwork with the other electronic device 120 or 104 or the server 106. The processor 120 may control other elements of the electronic device 101 and interwork with the other electronic device 102 or 104 or the server 106 based on the instructions stored in the memory 130. Hereinafter, operations of the electronic device 101 will be described based on each element of the electronic device 101. Instructions for causing each element of the electronic device 101 to perform the operations may be stored in the memory 130.

According to various embodiments of the present disclosure, the processor 120 may be a general-purpose processor such as a CPU, an AP, a CP, or etc., or a processor embedded in a particular element for performing various embodiments of the present disclosure.

According to various embodiments of the present disclosure, the processor 120 may wirelessly connect to a first AP using credential information through the wireless communication circuit included in the electronic device 101. For example, the processor 120 may perform scanning with respect to at least one accessible AP to perform a wireless communication connection. According to various embodiments of the present disclosure, an AP may be a device for connecting electronic devices that performs wireless communication to a wired device or relaying communication between the electronic devices. The processor 120 may perform scanning with respect to the at least one AP by using at least a part of the credential information. For example, the processor 120 may use at least a part of the credential information to perform scanning with respect to at least one AP using the identical credential information.

The processor 120 may send a probe request to at least one channel through the wireless communication circuit and receive a probe response sent from an AP of the same channel in response to the sent probe request, thus performing scanning with respect to at least one connectable AP. The processor 120 may select the first AP to be accessed for wireless communication connection through scanning based on a result of the scanning and access the selected first AP by using the credential information.

According to various embodiments of the present disclosure, the processor 120 may receive a list of first channels at least partially associated with at least one second AP having a coverage overlapping a coverage of the first AP among a plurality of APs using identical credential information through the wireless communication circuit. For example, the processor 120 may receive the list of the first channels from the first AP. The processor 120 may receive the list of the first channels from another electronic device or a server that manages the plurality of APs. The list of the first channels may include, but not all, a plurality of channels among available channels from a wireless protocol supported by the wireless communication circuit. For example, the list of the first channels may be associated with at least one second AP having the coverage overlapping that of the first AP, and may include, but not all, the plurality of channels among available channels from the wireless protocol.

According to various embodiments of the present disclosure, the processor 120 may receive information about the first channels at least partially associated with the at least one second AP. The processor 120 may generate the list of the first channels by using the received information about the first channels at least partially associated with the at least one second AP. The processor 120 may receive the information about the at least one second AP. The processor 120 may further use the received information about the at least one second AP during generation of the list of the first channels. For example, the information about the at least one second AP may include state information regarding the at least one second AP, location information regarding the at least one second AP, address information regarding the at least one second AP. However, this is merely an example for a description, and the present disclosure is not limited to the example, such that various information associated with the at least one second AP may be used to generate the list of the first channels.

According to various embodiments of the present disclosure, the processor 120 may delete the received or generated list of the first channels after an elapse of a designated time.

According to various embodiments of the present disclosure, the plurality of APs may have a coverage allowing wireless communication connection, and may perform wireless communication connection with electronic devices located in the coverage. The coverage of the plurality of APs is limited, such that as the electronic device 101 located in the coverage moves out of the coverage, wireless communication connection between the plurality of APs and the electronic device 101 may be released. To perform continuous wireless communication, the electronic device 101 may scan another AP connectable to perform wireless communication and may perform roaming by performing wireless communication connection with an AP found through scanning.

For example, the roaming performed by the electronic device 101 may include a series of operations of the electronic device 101 to perform wireless communication connection with at least one other AP, when, during communication of the electronic device 101 with at least one AP connected thereto, a condition of communication with the connected at least one AP is degraded because the electronic device 101 becomes distant from the connected at least one AP due to movement of the electronic device 101 or because of other reasons. To perform roaming, the electronic device 101 may receive and store the list of the first channels. The electronic device 101 may receive, for example, the information about the first channels and generate the list of the first channels by using the received information about the first channels.

According to various embodiments of the present disclosure, the processor 120 may perform scanning with respect to the at least one second AP that uses the credential information by using the list of the first channels through the wireless communication circuit. For example, the processor 120 may send a probe request through the first channels by using the information about the first channels included in the list of the first channels, and receive a probe response, thereby performing scanning with respect to the at least one second AP.

According to various embodiments of the present disclosure, the processor 120 may obtain a channel utilization (CU) value associated with each of the at least one second AP from the at least one second AP. The processor 120 may compare the obtained CU value associated with each of the at least one second AP with a designated threshold value. The processor 120 may select at least one AP for which scanning is to be performed, based on a result of the comparison. The processor 120 may perform scanning with respect to the selected at least one AP through the wireless communication circuit. The processor 120 may not perform scanning with respect to an AP of a channel currently having a high CU value, thus reducing a time required for scanning performed for roaming. The processor 120 may not perform scanning through all of available channels, thus reducing a time required for roaming. Inconvenience caused by data interruption that may occur due to roaming of the electronic device 101 may be addressed.

According to various embodiments of the present disclosure, the processor 120 may perform scanning with respect to the at least one second AP after detecting that a wireless connection for the first AP fails to satisfy a designated threshold condition. For example, the processor 120 may perform scanning with respect to the at least one second AP through the wireless communication circuit when an RSSI value for the first AP is less than or equal to a designated first threshold value. In another example, the processor 120 may perform scanning with respect to the at least one second AP through the wireless communication circuit when an RSSI value for the first AP exceeds the designated first threshold value and is less than or equal to a designated second threshold value, and a CU value for the first AP is greater than or equal to a designated third threshold value.

According to various embodiments of the present disclosure, a CU value may be calculated by an AP using:

Channel Utilization=Integer((channel busy time/
(dot11 Channel Utilization Beacon Intervals×
dot11 Beacon Period×1024))×255)     [Equation 1]

In Equation (1), the CU value is a value quantifying how busy a channel is, and based on the CU value, how much free time there is in a channel may be calculated. For Equation (1) according to various embodiments of the present disclosure, the 802.11 standard document (Institute of Electrical and Electronics Engineers (IEEE) Standard 802.11TM-2012) may be referred to. According to various embodiments of the present disclosure, the processor 120 may use a CU value calculated by an AP, and an extra throughput possible in the AP may be predicted using a bandwidth, a modulation and coding scheme (MCS) index, and/or an RSSI value and whether to perform scanning for roaming may be determined based on the extra throughput. For example, the processor 120 may calculate a roaming trigger score as shown in Equation (2), and scanning for roaming may be performed when the roaming trigger score decreases to a designated threshold value or less instantly or during a designated period.

Roaming Trigger Score=(1−CU/255)×(MAX TP
(throuput) with MCS Index and Bandwidth)     [Equation 2]

According to various embodiments of the present disclosure, the processor 120 may perform scanning with respect to the at least one second AP and then perform a wireless connection with one of the at least one second AP by using the credential information through the wireless communication circuit. For example, the processor 120 may obtain at least one of an RSSI value or a CU value for each of the at least one second AP. The processor 120 may obtain an RSSI value for the at least one second AP through signals (e.g., a probe request, a probe response, etc.) transmitted and received to and from the at least one second AP during scanning with respect to the at least one second AP. The processor 120 may obtain a CU value for the at least one second AP from the at least one second AP during scanning with respect to the at least one second AP.

According to various embodiments of the present disclosure, the processor 120 may select an AP that is to be wireless-communication-connected from among the at least one second AP, by using at least one of the obtained RSSI value or CU value for the at least one second AP. The processor 120 may perform the wireless communication connection with the AP selected from among the at least one second AP.

According to various embodiments of the present disclosure, the processor 120 may receive a list of second channels associated with at least one third AP that does not have a coverage overlapping that of the first AP among the plurality of APs through the wireless communication circuit. The processor 120 may receive the list of the second channels associated with the at least one third AP determined to be connectable based on a location of the first AP, even when the at least one third AP does not have the coverage overlapping that of the wireless-communication-connected first AP. For example, the processor 120 may receive the list of the second channels associated with the at least one third AP located within a designated distance from the location of the first AP, even when the at least one third AP does not have the coverage overlapping that of the first AP. In spite of APs using identical credential information, channels associated with an AP determined that roaming to the AP is not physically possible based on the location of the first AP may not be included in the list of the second channels.

For example, the list of the second channels may include, but not all, a plurality of channels among available channels from a wireless protocol supported by the wireless communication circuit. For example, the list of the second channels may be associated with the at least one third AP having the coverage overlapping that of the first AP, and may include, but not all, the plurality of channels among available channels from the wireless protocol.

According to various embodiments of the present disclosure, the processor 120 may perform scanning with respect to the at least one third AP that uses the credential information by using the list of the second channels through the wireless communication circuit. For example, the processor 120 may perform scanning with respect to the at least one second AP by using the list of the first channels, and may further perform scanning with respect to the at least one third AP by using the list of the second channels.

According to various embodiments of the present disclosure, the processor 120 may perform scanning with respect to the at least one second AP and the at least one third AP and then perform a wireless connection with one of the at least one second AP and the at least one third AP by using the credential information through the wireless communication circuit.

According to various embodiments of the present disclosure, the processor 120 may receive the list of the third channels associated with at least one fourth AP having a coverage overlapping that of an AP wirelessly connected after performing the scanning among the plurality of APs, through the wireless communication circuit. The processor 120 may update the list of the first channels associated with the received first AP by using the received list of the third channels. The processor 120 may perform a new wireless communication connection with the AP, and update the list of the first channels, which is a list of channels used for existing roaming, based on the currently connected AP by using the list of the third channels, as the wireless connection with the first AP is released. For example, the processor 120 may compare the list of the first channels with the list of the third channels, identify channels that are not included in the list of the first channels from among the third channels included in the list of the third channels, and add the identified channels to the list of the first channels, thereby updating the list of the first channels.

According to various embodiments of the present disclosure, the processor 120 may adjust a dwell time for at least one channel among channels associated with at least one AP for which scanning is to be performed. The dwell time may indicate a designated time waited for transmission of a probe request to at least one channel and reception of a probe response transmitted from an AP of the same channel in response to the transmitted probe request when scanning is performed.

According to various embodiments of the present disclosure, the processor 120 may adjust the dwell time according to a complexity of a channel. For example, the processor 120 may determine complexities of first channels associated with the at least one second AP. The processor 120 may determine the complexities of the first channels by identifying the amount of use of the first channels, a time for which the first channels are occupied, etc. The processor 120 may adjust a dwell time for at least one channel determined to have a channel complexity greater than or equal to a designated threshold value among the first channels, based on a result of the complexity determination with respect to the first channels.

According to various embodiments of the present disclosure, the processor 120 may adjust the dwell time according to the number of identified APs for which scanning is to be performed using a list of channels or a channel list. For example, when the number of at least one second APs identified using the list of the first channels is less than or greater than a designated value, the processor 120 may increase a dwell time for channels associated with the at least one second AP.

According to various embodiments of the present disclosure, the processor 120 may determine whether to perform additional scanning according to a complexity of a channel. For example, the processor 120 may determine the complexities of the first channels associated with the at least one second AP. After completing scanning for the first channels, the processor 120 may perform additional scanning for at least one channel determined to have a channel complexity greater than or equal to a designated threshold value among the first channels, based on a result of the complexity determination with respect to the first channels.

Figure 2:
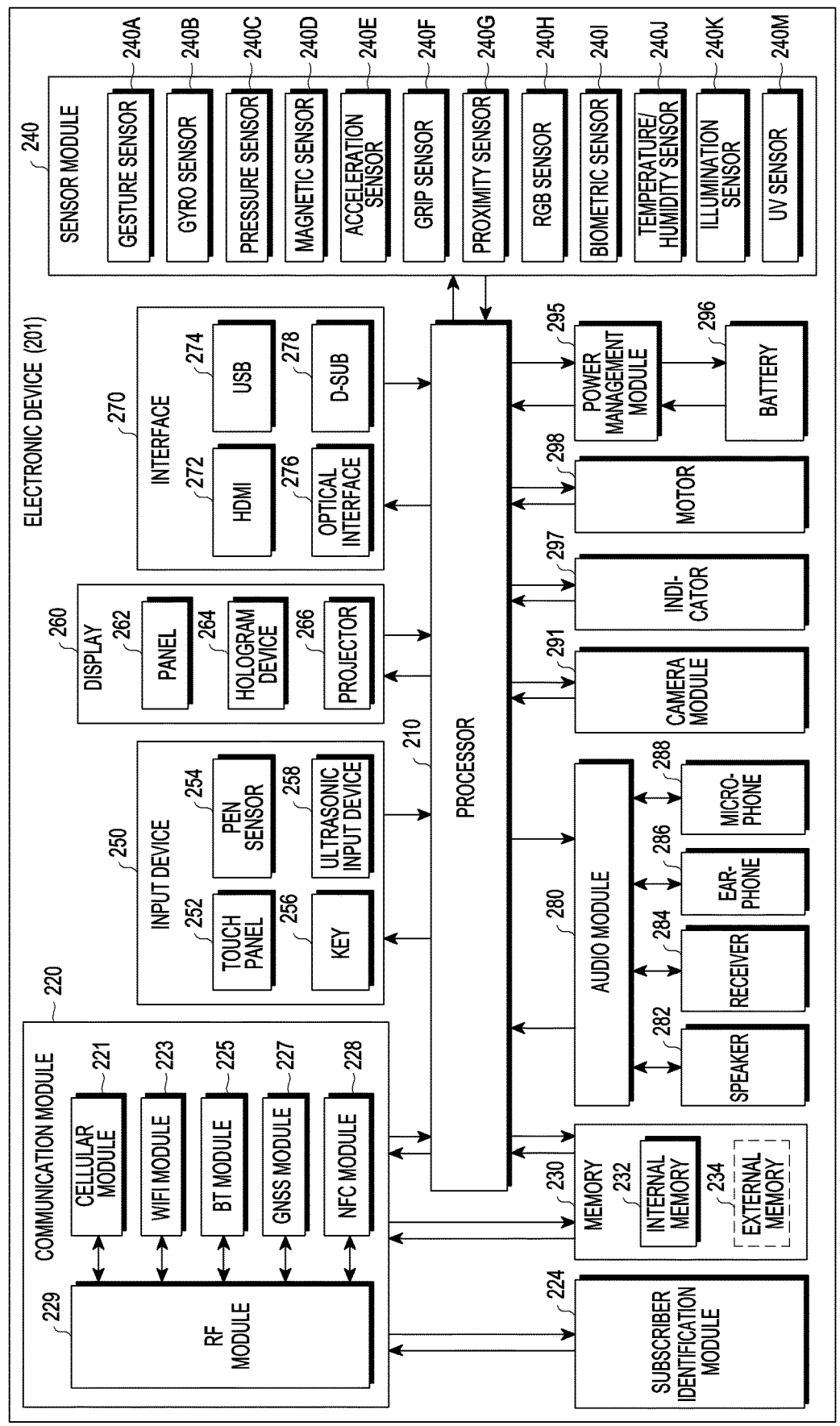
FIG. 2 is a block diagram of a programming module according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment of the present disclosure, the cellular module 221 may identify and authenticate the electronic device 201 in a communication network by using the SIM 224 (e.g., a SIM card). According to an embodiment of the present disclosure, the cellular module 221 may perform at least one of functions that may be provided by the processor 210. According to an embodiment of the present disclosure, the cellular module 221 may include a communication processor (CP). According to an embodiment of the present disclosure, at least some (e.g., two or more) of the cellular module 221, the WiFi module 223, the BT module 225, the GNSS module 227, or the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment of the present disclosure, at least one of the cellular module 221, the WiFi module 223, the BT module 225, the GNSS module 227, or the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a nonvolatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment of the present disclosure, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment of the present disclosure, the panel 262 may include a pressure sensor (or a "force sensor") capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. According to an embodiment, the interface 270 may include a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA standard interface.

The audio module 280 may bi-directionally convert sound and an electric signal. At least one element of the audio module 280 may be included in the I/O interface 145 illustrated in FIG. 1. The audio module 280 may process sound information input or output through the speaker 282, the receiver 284, the earphone 286, or the microphone 288. The camera module 291 may be, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 may manage power of the electronic device 201. According to an embodiment of the present disclosure, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, a rectifier, etc. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments of the present disclosure, some components of the electronic device (e.g., the electronic device 201) may be omitted or may further include other elements, and some of the components may be coupled to form one entity and identically perform functions of the components before being coupled.

Figure 3:
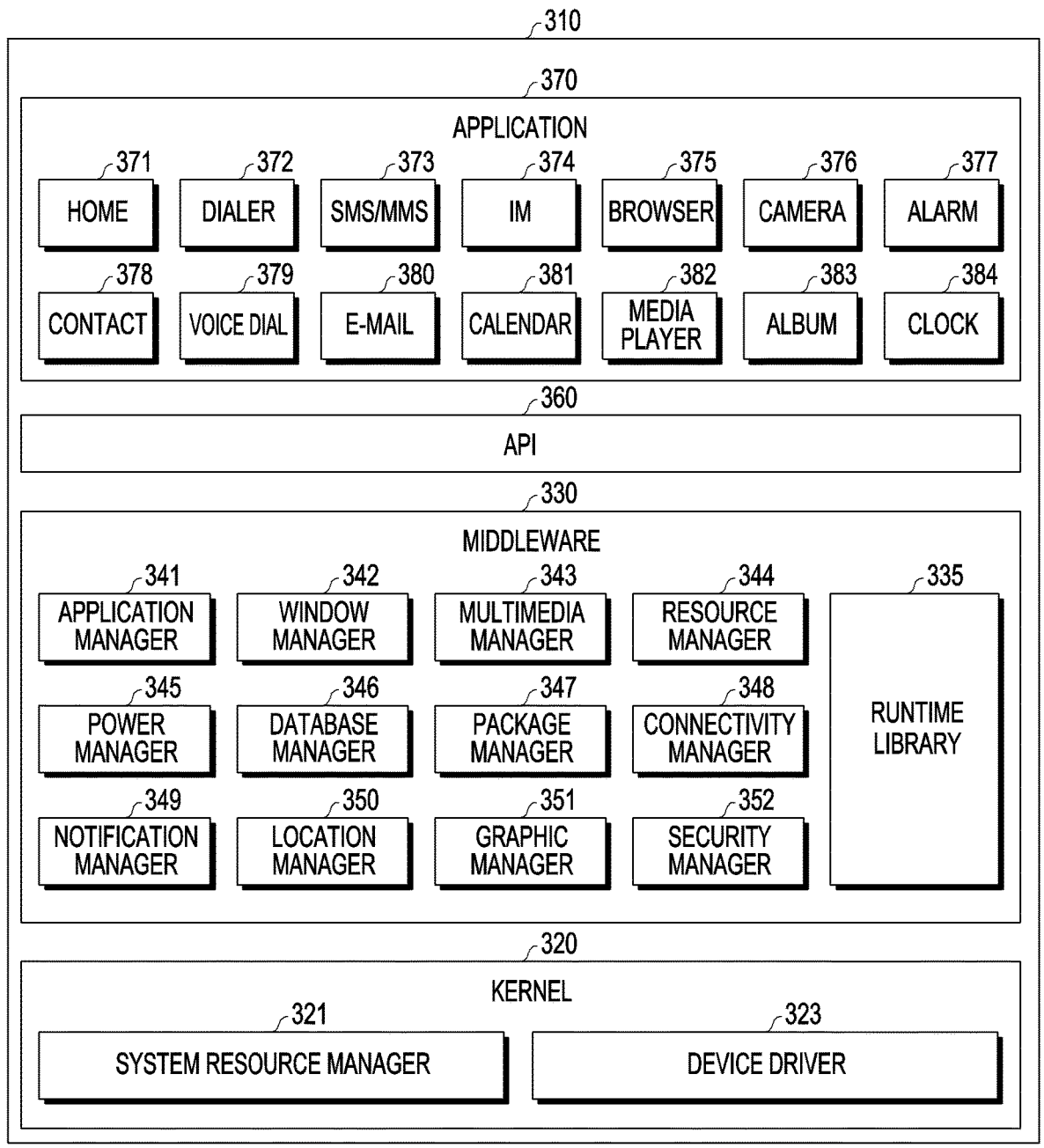
FIG. 3 is a block diagram of an electronic device according to various embodiments of the present disclosure.

FIG. 3 is a block diagram of a programming module according to various embodiments of the present disclosure. According to an embodiment of the present disclosure, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the electronic device 102 or 104, or the server 106).

The kernel 320 may include a system resource manager 321 and/or a device driver 323. The system resource manager 321 may perform control, allocation, retrieval of system resources, and so forth. According to an embodiment of the present disclosure, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 may manage a life cycle of the applications 370. The window manager 342 may manage a graphic user interface (GUI) resource used in a screen. The multimedia manager 343 may recognize a format necessary for playing media files and perform encoding or decoding on a media file by using a codec appropriate for a corresponding format. The resource manager 344 may manage a source code or a memory space of the applications 370. The power manager 345 may manage a battery or power and provide power information necessary for an operation of the electronic device. According to an embodiment, the power manager 345 may operate with basic input/output system (BIOS). The database manager 346 may generate, search or change a database used for at least one application among the applications 370. The package manager 347 may manage the installation or update of an application distributed in a package file format.

The connectivity manager 348 may manage a wireless connection. The notification manager 349 may provide an event, e.g., an arriving message, an appointment, proximity notification, etc. The location manager 350 may manage location information about an electronic device. The graphic manager 351 may manage, for example, a graphic effect to be provided to a user or a user interface relating thereto. The security manager 352 may provide, for example, system security or user authentication. According to an embodiment of the present disclosure, the middleware 330 may further include a telephony manager for managing a voice or video call function of the electronic device or a middleware module forming a combination of functions of the above-described components. According to an embodiment of the present disclosure, the middleware 330 may provide a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
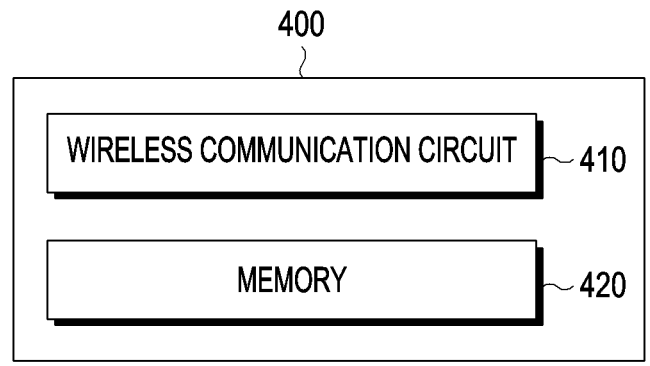
FIG. 4 is a block diagram of an access point (AP) according to various embodiments of the present disclosure.

FIG. 4 is a block diagram of an AP according to various embodiments of the present disclosure.

According to various embodiments of the present disclosure, an AP 400 may include a wireless communication circuit 410 and a memory 420 that are located in a housing thereof.

According to various embodiments of the present disclosure, the AP 400 may be a device for connecting various electronic devices that performs wireless communication to a wired device or relaying communication between the wireless communication electronic devices. Although not shown, the AP 400 may include a slot connectable with a wired communication cable and may be connected to a wired communication network through the wired communication cable and transmit and receive data to and from a server or an external another electronic device through the connected wired communication network. Although not shown, the AP 400 may include at least one of the elements included in the electronic device 101 illustrated in FIG. 1 and the electronic device 201 illustrated in FIG. 2.

According to various embodiments of the present disclosure, the AP 400 may be connected with at least one of other electronic devices over a wireless communication network through a wireless communication circuit 410. The wireless communication circuit 410 may include an antenna, a wireless communication chip, or a processor (not shown) that controls an operation of the wireless communication circuit 410. The operation of the wireless communication circuit 410 described below may be controlled by the processor included in the wireless communication circuit 410 or may be controlled by a processor (not shown) located outside the wireless communication circuit 410 included in the AP 400. The AP 400 may perform communication by using various standards such as the IEEE 802.11 standards, etc. For example, the AP 400 may perform communication by using various communication schemes such as WiFi, near-field communication (NFC), Bluetooth, etc. The wireless communication circuit 410 may be configured to support a wireless protocol according to various communication schemes.

According to various embodiments of the present disclosure, the wireless communication circuit 410 may encrypt a packet by using various encryption methods for security of wireless communication, and transmit the encrypted packet to an external other electronic device. The wireless communication circuit 410 may perform authentication with respect to an external another electronic device that attempts an access, and perform wireless communication connection with the authenticated electronic device by using credential information.

According to various embodiments of the present disclosure, the wireless communication circuit 410 may store and manage a list of first channels at least partially associated with at least one other AP having a coverage overlapping a coverage of the AP 400 among a plurality of APs using identical credential information at an instant through the wireless communication circuit 410. The wireless communication circuit 410 may manage the list of the first channels through another electronic device (e.g., a wireless LAN controller (WLC)) that manages an external server or a plurality of APs.

According to various embodiments of the present disclosure, the wireless communication circuit 410 may receive information about the first channels at least partially associated with the at least one other AP from the at least one other AP. In another example, the wireless communication circuit 410 may further receive the information about the at least one other AP. The wireless communication circuit 410 may receive the information about the first channels and the information about the at least one other AP from a server or a WLC that manages the at least one other AP or the plurality of APs including the at least one other AP.

According to various embodiments of the present disclosure, the wireless communication circuit 410 may generate the list of the first channels by using the received information about the first channels and store the generated list of the first channels in the memory 420.

According to various embodiments of the present disclosure, the wireless communication circuit 410 may generate the list of the first channels by using the information about the first channels and the information about the at least one other AP. For example, the information about the at least one other AP may include state information regarding the at least one other AP, location information regarding the at least one second AP, address information regarding the at least one other AP, or the like. However, this is merely an example for a description, and the present disclosure is not limited to the example, such that various information associated with the at least one other AP having the coverage overlapping that of the AP 400 may be used to generate the list of the first channels.

According to various embodiments of the present disclosure, the wireless communication circuit 410 may generate the list of the first channels before or after connection with another electronic device. In another example, the wireless communication circuit 410 may generate the list of the first channels at the request of the another electronic device. A method of generating a channel list will be described later.

According to various embodiments of the present disclosure, the wireless communication circuit 410 may store the list of the second channels at least partially associated with at least one other AP that does not have a coverage overlapping that of the AP 400 among a plurality of APs in the memory 420.

According to various embodiments of the present disclosure, the wireless communication circuit 410 may receive information about the second channels associated with at least one other AP determined to be connectable based on a location of the AP 400, even when the at least one other AP does not have the coverage overlapping that of the AP 400. For example, the wireless communication circuit 410 may receive the list of the second channels at least partially associated with at least one other AP located within a designated distance from the location of the AP 400, even when the at least one other AP does not have the coverage overlapping that of the AP 400. In spite of another AP using identical credential information, channels at least partially associated with the other AP determined that roaming to the AP is not physically possible based on the location of the AP 400 may not be included in the list of the second channels.

According to various embodiments of the present disclosure, the wireless communication circuit 410 may generate the list of the second channels by using the received information about the second channels and store the generated list of the second channels in the memory 420.

According to various embodiments of the present disclosure, the wireless communication circuit 410 may generate the list of the second channels by further using the information about the at least one other AP. For example, the information about the at least one other AP may include state information regarding the at least one other AP, location information regarding the at least one second AP, address information regarding the at least one other AP, or the like. However, this is merely an example for a description, and the present disclosure is not limited to the example, such that various information associated with the at least one other AP that does not have the coverage overlapping that of the AP 400 may be used to generate the list of the first channels and the list of the second channels.

According to various embodiments of the present disclosure, the information about the first channels or the information about the second channels used to generate the list of the first channels or the list of the second channels may be input by a manager managing the plurality of APs using the identical credential information.

According to various embodiments of the present disclosure, the list of the first channels or the list of the second channels may be generated as shown in Table 1.

TABLE 1

| AP MAC Address | 2.4 GHz Channel | 5 GHz Channel |
|---|---|---|
| AA:AA:AA:AA:AA:AA: | 1 | 36 |
| BB:BB:BB:BB:BB:BB | 6 | 48 |

TABLE 1-continued

| AP MAC Address | 2.4 GHz Channel | 5 GHz Channel |
|---|---|---|
| CC:CC:CC:CC:CC:CC | 11 | 149 |
| DD:DD:DD:DD:DD:DD | 1 | 52 |
| EE:EE:EE:EE:EE:EE | 6 | 36 |

As shown in Table 1, the list of the first channels may include a media access control (MAC) address of other APs having a coverage overlapping that of the AP 400 and information about channels for each band associated with the other APs. In another example, the list of the first channels may include other information in addition to information included in Table 1. For example, the list of the first channels includes CU information about the other APs and information about another AP associated with the other APs. In another example, the list of the second channels may include the MAC address of the other APs that do not have a coverage overlapping that of the AP 400 and the information about the channels for each band associated with the other APs, as shown in Table 1. In another example, the list of the first channels may include other information in addition to information included in Table 2. In another example, the list of the second channels may include CU information about the other APs. The list of the second channels may include information about another AP associated with the other APs.

However, this is merely an example, and the present disclosure is not limited to the example, and the list of the first channels or the list of the second channels may be generated in various forms including information about channels associated with APs available during scanning for roaming.

According to various embodiments of the present disclosure, the wireless communication circuit 410 may update a channel list stored in the memory 420. For example, the wireless communication circuit 410 may update the list of the first channels when another AP having a coverage overlapping that of the AP 400 is added or state information about at least one other AP having a coverage overlapping that of the AP 400 is changed. In another example, the wireless communication circuit 410 may update the list of the second channels when another AP that does not have a coverage overlapping that of the AP 400 is added or state information about at least one other AP that does not have a coverage overlapping that of the AP 400 is changed.

According to various embodiments of the present disclosure, the wireless communication circuit 410 may provide the list of the first channels stored in the memory 420 to an external electronic device that is wireless-communication-connected. In another example, the wireless communication circuit 410 may provide the list of the second channels stored in the memory 420 to an external electronic device that is wireless-communication-connected.

According to various embodiments of the present disclosure, the wireless communication circuit 410 may provide at least one of the list of the first channels or the list of the second channels to an external electronic device (e.g., the electronic device 101 of FIG. 1, the electronic device 201 of FIG. 2, or the AP 400 of FIG. 4). In another example, when receiving a request for a channel list from the external electronic device, the wireless communication circuit 410 may provide at least one of the list of the first channels or the list of the second channels.

According to various embodiments of the present disclosure, the wireless communication circuit 410 may generate one channel list including information about channels associated with a plurality of APs to which roaming is possible, without separating the channel list provided to another electronic device (e.g., the electronic device 101 of FIG. 1) into the list of the first channels or the list of the second channels. The wireless communication circuit 410 may transmit the generated channel list to another electronic device.

Figure 5:
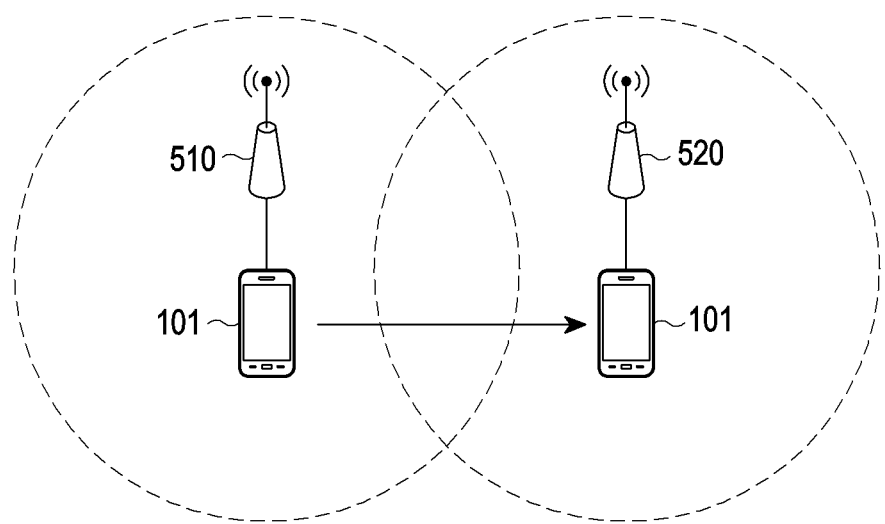
FIG. 5 is a view for describing roaming of an electronic device according to a comparison example.

FIG. 5 is a view for describing roaming of an electronic device according to a comparison example.

As shown in FIG. 5, when the electronic device 101 (e.g., the electronic device 101 of FIG. 1 or the electronic device 201 of FIG. 2) located in a coverage of an AP1 510 (e.g., the AP 400 of FIG. 4) communicates with the AP1 510 through a wireless communication connection, the electronic device 101 may perform roaming when becoming distant from the AP1 510 due to movement of the electronic device 101. In another example, although not shown, the electronic device 101 may perform roaming even when a condition of communication with the AP1 510 becomes poor for other reasons.

For example, when the electronic device 101 becomes distant from the AP 1 510 due to movement thereof and an RSSI value for the AP 1 510 is less than or equal to a designated threshold value, the electronic device 101 may determine that roaming is required and perform roaming. In another example, when a CU value for the AP1 510, obtained from the AP1 510, is less than or equal to the designated threshold value, the electronic device 101 may determine that roaming is required and perform roaming. In another example, the electronic device 101 may determine from a parameter such as Tx error rate or a signal to noise ratio (SNR) for the AP 1 510 whether roaming is required.

According to an embodiment of the present disclosure, when the electronic device 101 determines that roaming is required, the electronic device 101 may perform scanning with respect to at least one other AP using credential information that is identical to that of the AP1 510. As shown in FIG. 5, when an AP2 520 (e.g., the AP 400 of FIG. 4) is found through scanning, the electronic device 101 may reduce disconnection of data communication by performing communication connection with the AP2 520.

Figure 6:
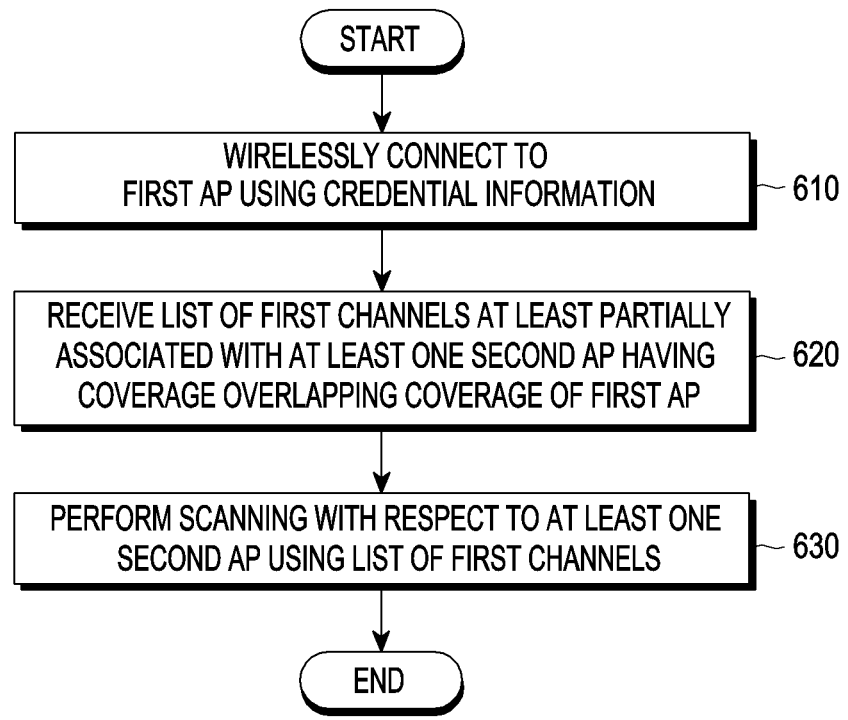
FIG. 6 is a flowchart illustrating a roaming method of an electronic device according to various embodiments of the present disclosure.

FIG. 6 is a flowchart illustrating a roaming method of an electronic device according to various embodiments of the present disclosure.

In operation 610, the electronic device 101 (e.g., the electronic device 101 of FIG. 1 or the electronic device 201 of FIG. 2) may wirelessly connect to a first AP (e.g. the AP 400 of FIG. 4) using credential information through a wireless communication circuit of the electronic device 101. For example, the electronic device 101 may perform scanning with respect to at least one connectable AP connectable to perform a wireless communication connection. The electronic device 101 may select the first AP to be accessed for wireless communication connection through scanning and access the selected first AP by using the credential information.

In operation 620, the electronic device 101 may receive the list of the first channels at least partially associated with the at least one second AP (e.g., the AP 400 of FIG. 4) having a coverage overlapping a coverage of the first AP among the plurality of APs using identical credential information through the wireless communication circuit. For example, the electronic device 101 may send a request for the list of the first channels for use in roaming to another device or a server that manages the first AP or the plurality of APs. The electronic device 101 may receive the list of the first channels from an external electronic device or a server that manages the first AP or the plurality of APs, in response to the request.

According to various embodiments of the present disclosure, the electronic device 101 may receive information about the list of the first channels from another electronic device or a server that manages the first AP or the plurality of APs. The electronic device 101 may generate and store the list of the first channels based on the information about the first channels, when receiving the information about the first channels.

In operation 630, the electronic device 101 may perform scanning with respect to the at least one second AP that uses the credential information by using the received list of the first channels through the wireless communication circuit.

According to various embodiments of the present disclosure, the electronic device 101 may further receive the list of the second channels associated with at least one third AP that does not have a coverage overlapping that of the first AP among the plurality of APs. In this case, the electronic device 101 may perform scanning for the at least one second AP and the at least one third AP that use the credential information by using the received list of the first channels and the received list of the second channels.

According to various embodiments of the present disclosure, the electronic device 101 may perform scanning for channels included in at least one of the list of the first channels or the list of the second channels without needing to perform scanning for available channels. In this way, the electronic device 101 may reduce inconvenience caused by data interruption or power consumption occurring due to scanning through all available channels.

Figure 7A:
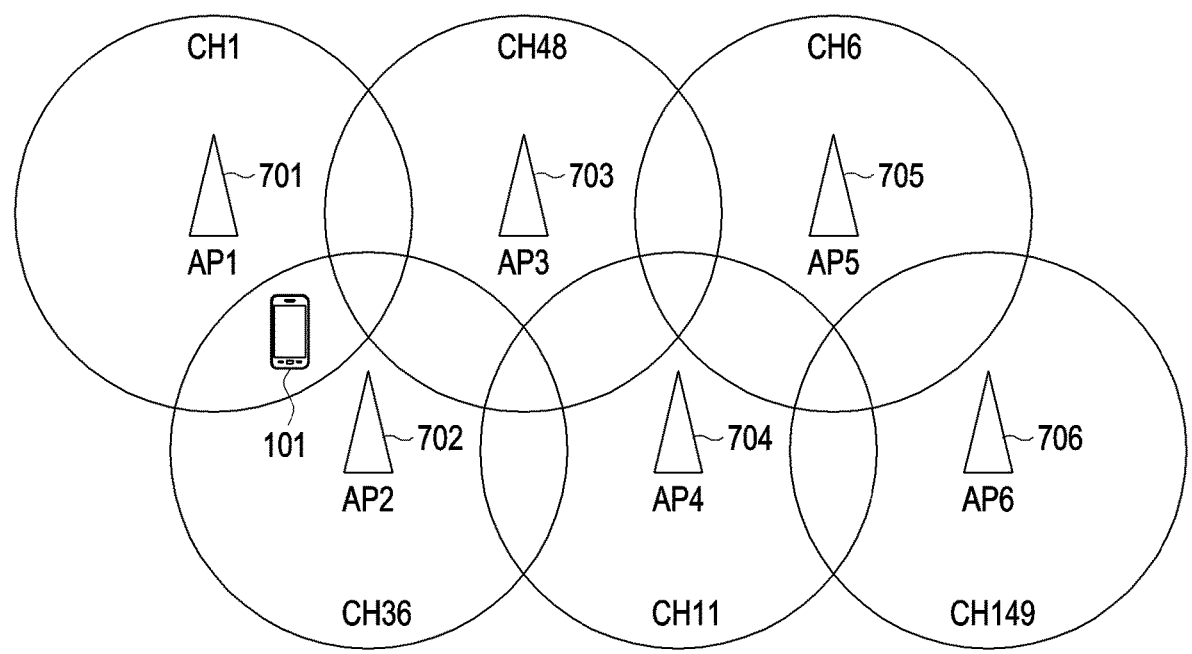
FIGS. 7A through 7C are views for describing a roaming method of an electronic device according to various embodiments of the present disclosure.
Figure 7B:
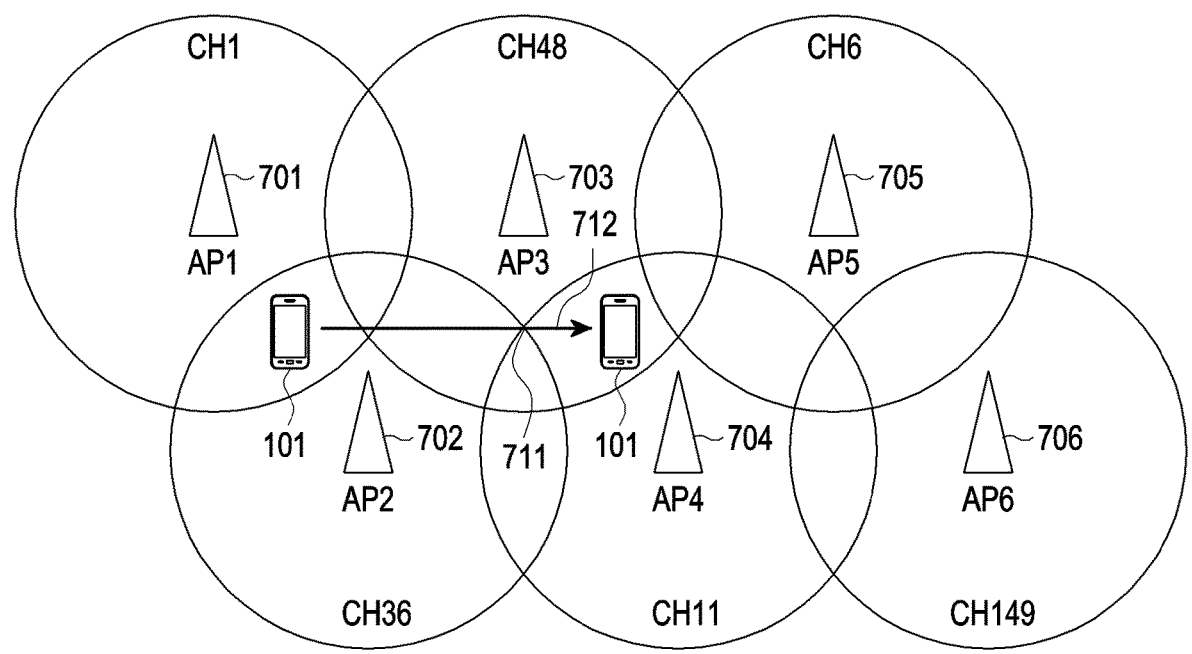
Figure 7C:
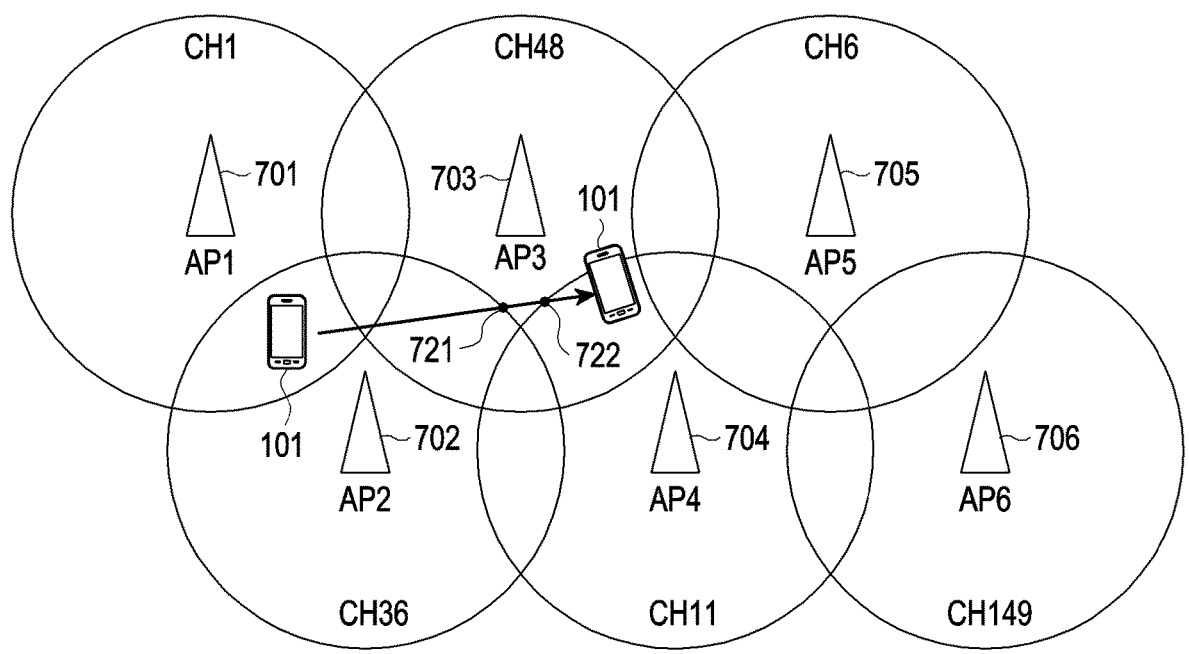

FIGS. 7A through 7C are views for describing a roaming method of an electronic device according to various embodiments of the present disclosure.

As shown in FIGS. 7A through 7C, a plurality of APs 701, 702, 703, 704, 705, and 706 (e.g., the AP 400 of FIG. 4) may have coverages indicating ranges in which wireless communication connection is possible, respectively. Each of the plurality of APs 701, 702, 703, 704, 705, and 706 may perform a wireless communication connection with an electronic device (e.g., the electronic device 101 of FIG. 1 or the electronic device 201 of FIG. 2) located in the coverage.

Referring to FIG. 7A, the electronic device 101 (e.g., the electronic device 101 of FIG. 1 or the electronic device 201 of FIG. 2) may perform scanning for a wireless communication connection. For example, the electronic device 101 may perform full scanning that is scanning for all available channels. The electronic device 101 may find an AP1 701 (e.g., the AP 400 of FIG. 4) and an AP2 702 (e.g., the AP 400 of FIG. 4) as a result of full scanning.

According to an embodiment of the present disclosure, the electronic device 101 may perform a wireless communication connection with one of the found AP1 701 and AP2 702. For example, for a wireless communication connection based on an RSSI value, when an RSSI value of the AP2 702 is greater than that of the AP1 701, the electronic device 101 may select the AP2 702 as an AP that is to be wireless-communication-connected and perform the wireless communication connection with the selected AP2 702.

According to various embodiments of the present disclosure, the electronic device 101 may perform a connection with the AP2 702 and receive the list of the first channels associated with the AP1 701, the AP3 703, and the AP4 704 having coverages overlapping the AP2 702 among the plurality of APs 701, 702, 703, 704, 705, and 706. The list of the first channels may include information about a channel 1, a channel 48, and a channel 11 that are associated with the AP1 701, the AP3 703, and the AP4 704 having coverages overlapping the AP2 702. In another example, in the list of the first channels, a channel associated with the AP2 702 may further include information about a channel 36.

According to various embodiments of the present disclosure, the electronic device 101 may receive information about the first channels associated with the AP1 701, the AP3 703, and the AP4 704 having coverages overlapping the AP2 702 among the plurality of APs 701, 702, 703, 704, 705, and 706, or information about the AP1 701, the AP3 703, and the AP4 704. The electronic device 101 may generate the list of the first channels by using the information about the first channels associated with the AP1 701, the AP3 703, and the AP4 704, or the information about the AP1 701, the AP3 703, and the AP4 704. Hereinbelow, a description will be focused on reception of the list of the first channels, but the present disclosure is not limited thereto, such that the electronic device 101 may receive information used to generate the list of the first channels and generate the list of the first channels by using the received information.

According to various embodiments of the present disclosure, the electronic device 101 may perform a connection with the AP2 702 and receive the list of the first channels associated with the AP1 701, the AP5 703, and the AP6 704 that do not have the coverages overlapping the AP2 702 among the plurality of APs 701, 702, 705, 706, 705, and 706. The list of the second channels may include information about a channel 6 and a channel 149 that are associated with the AP5 705 and the AP6 706 that do not have coverages overlapping the AP2 702.

According to various embodiments of the present disclosure, the electronic device 101 may receive the list of the first channels or the list of the second channels from the AP2 702. In another example, the electronic device 101 may receive the list of the first channels or the list of the second channels from another electronic device or a server that manages the plurality of APs 701, 702, 703, 704, 705, and 706. The electronic device 101 may send a request for the list of the first channels or the list of the second channels to another electronic device or a server that manages the AP2 702 or the plurality of APs 701, 702, 703, 704, 705, and 706. In another example, another electronic device (e.g., the AP 400 or the WLC) or the server that manages the AP2 702 or the plurality of APs 701, 702, 703, 704, 705, and 706 may transmit the list of the first channels or the list of the second channels to the electronic device 101 without receiving a separate request, as detecting a wireless communication connection between the electronic device 101 and the AP2 702.

According to various embodiments of the present disclosure, when the electronic device 101 fails to receive the list of the first channels or the list of the second channels, the electronic device 101 may perform partial scanning for searching for an AP to which roaming is possible based on a result of scanning for the wireless communication connection with the AP2 702. For example, partial scanning may indicate scanning for at least one of available channels rather than scanning for all available channels.

For example, as shown in FIG. 7A, the electronic device 101 is located in a location where the coverage of the AP1 701 and the coverage of the AP2 702 overlap each other, such that the electronic device 101 may search for the AP1 701 and the AP2 702 through scanning and may include information about the channel 1 and the channel 36 associated with the found AP1 701 and AP2 702. When a condition of communication with the AP2 702 that is wireless-communication-connected with the electronic device 101 becomes poor due to movement of the electronic device 101 or other reasons, the electronic device 101 may perform partial scanning through the channel 1 and the channel 36.

According to various embodiments of the present disclosure, when the electronic device 101 includes information about channels associated with APs found based on a result of scanning, the electronic device 101 may not include information about all channels associated with APs to which roaming is possible. The electronic device 101 may not find an AP to which roaming is possible, through partial scanning. The electronic device 101 may have to perform full scanning that is scanning for all available channels, when an AP to which roaming is possible is not found through partial scanning. Full scanning is scanning for all available channels, such that much time is required for partial scanning, and a user may experience data interruption due to an increase in the required time and a loss may occur in use of a channel. The electronic device 101 may consume as much current as the increase in the required time.

According to various embodiments of the present disclosure, the electronic device 101 may receive the list of the first channels or the list of the second channels, thus obtaining information about channels associated with APs to which roaming is possible. When a condition of communication with the AP2 702 wireless-communication-connected with the electronic device 101 becomes poor due to movement of the electronic device 101 or other reasons, the electronic device 101 may find an AP to which roaming is possible through partial scanning by using the received list of the first channels or the received list of the second channels.

As shown in FIG. 7B, the electronic device 101 may move from a location where the coverage of the AP1 701 and the coverage of the AP2 702 overlap each other to a location where the coverage of the AP3 703 and the coverage of the AP4 704 overlap each other. As a condition of communication with the wirelessly connected AP2 702 becomes poor due to movement of the electronic device 101, the electronic device 101 may perform partial scanning by using the list of the first channels or the list of the second channels in a point 711.

According to an embodiment of the present disclosure, the electronic device 101 may identify information about the channel 1, the channel 48, and the channel 11 that are associated with the AP1 701, the AP3 703, and the AP4 704 from the list of the first channels. Based on the identified information about the channel 1, the channel 48, and the channel 11, the electronic device 101 may perform partial scanning with respect to APs to which roaming is possible through the channel 1, the channel 48, and the channel 11, when the electronic device 101 is located in the point 711. The electronic device 101 may find the AP3 703 and the AP4 704 as a result of partial scanning and perform roaming through a wireless communication connection with one of the found AP3 703 and AP4 704. For example, for a wireless communication connection based on an RSSI value, when an RSSI value of the AP4 704 is greater than that of the AP3 703, the electronic device 101 may select the AP4 704 as an AP that is to be wireless-communication-connected. The electronic device 101 may perform roaming through a wireless communication connection with the AP4 704.

As shown in FIG. 7C, for example, based on the identified information about the channel 1, the channel 48, and the channel 11, the electronic device 101 may perform partial scanning with respect to APs to which roaming is possible through the channel 1, the channel 48, and the channel 11, when the electronic device 101 is located in the point 721. The electronic device 101 may find the AP3 703 and the AP4 704 as a result of partial scanning and perform roaming through a wireless communication connection with one of the found AP3 703 and AP4 704. For example, for a wireless communication connection based on an RSSI value, when an RSSI value of the AP3 703 is greater than that of the AP3 703, the electronic device 101 may select the AP3 703 as an AP that is to be wireless-communication-connected. The electronic device 101 may perform roaming through a wireless communication connection with the AP3 704.

According to various embodiments of the present disclosure, when performing partial scanning with respect to APs to which roaming is possible by using the list of the first channels or the list of the second channels, the electronic device 101 may obtain a CU value associated with the APs from the APs to which roaming is possible. The electronic device 101 may compare the CU value associated with each of the APs with a designated threshold value. The electronic device 101 may determine at least one AP with respect to which partial scanning is to be performed from among the APs based on a result of comparison, and perform partial scanning with respect to the determined at least one AP.

Referring to FIG. 7B, the electronic device 101 may obtain CU values associated with the AP1 701, the AP3 703, and the AP4 704 when performing partial scanning by using the list of the first channels or the list of the second channels in the point 711. When the electronic device 101 determines that a CU for the channel 48 associated with the AP3 703 is high, as a result of comparing the CU values associated with the AP1 701, the AP3 703, and the AP4 704 with the designated threshold value, the electronic device 101 may not perform scanning with respect to the AP3 703 through the channel 48.

Referring to FIG. 7B, when the electronic device 101 determines that the CU value for the channel 48 associated with the AP3 703 is high, and thus performs scanning with respect to the AP3 703 through the channel 48, the electronic device 101 may perform a wireless communication connection with the AP4 704 found through partial scanning except for the AP3 703.

According to various embodiments of the present disclosure, when the electronic device 101 does not receive the list of the first channels or the list of the second channels, the electronic device 101 may perform partial scanning with respect to APs to which roaming is possible through the channels 1 and 36 that are associated with the AP1 701 and the AP2 702 found through scanning in the wireless communication connection with the AP2 702 in the point 711. In this case, the electronic device 101 may not find the AP3 703 and the AP4 704 using partial scanning through the channels 1 and 36, and thus the electronic device 101 may need to perform full scanning with respect to all available channels in a point 712 to search for an AP to which roaming is possible. The electronic device 101 may find the AP3 703 and the AP4 704 through full scanning and perform roaming through a wireless communication connection with one of the found AP3 703 and AP4 704. As such, when the electronic device 101 does not receive the list of the first channels or the list of the second channels, the electronic device 101 may need to perform full scanning, and thus a time required for roaming may increase.

As shown in FIG. 7C, the electronic device 101 according to an embodiment of the present disclosure may perform partial scanning with respect to APs to which roaming is possible through the channels 1 and 36 in a point 721. In this case, the electronic device 101 may not find the AP3 703 and the AP4 704 using partial scanning, and thus the electronic device 101 may need to perform full scanning with respect to all available channels in a point 722 to search for an AP to which roaming is possible. The electronic device 101 may find the AP3 703 and the AP4 704 through full scanning and perform roaming through a wireless communication connection with one of the found AP3 703 and AP4 704. When the electronic device 101 does not receive the list of the first channels or the list of the second channels, the electronic device 101 may need to perform full scanning, and thus a time required for roaming may increase.

Figure 8:
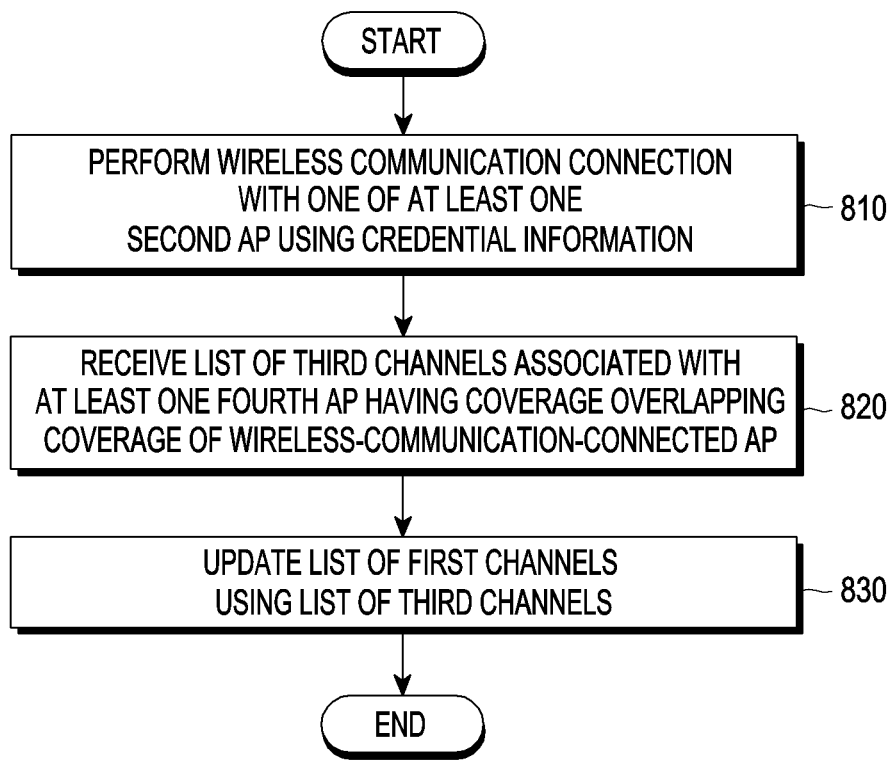
FIG. 8 is a flowchart illustrating a method of updating a list of channels by an electronic device, according to various embodiments of the present disclosure.

FIG. 8 is a flowchart illustrating a method of updating a list of channels by an electronic device, according to various embodiments of the present disclosure.

In operation 810, after the electronic device 101 (e.g., the electronic device 101 of FIG. 1 or the electronic device 201 of FIG. 2) performs scanning with respect to at least one second AP (e.g., the AP1 701, the AP3 703, and the AP4 704 of FIG. 7B) having a coverage overlapping that of a first AP (e.g., the AP2 702 of FIG. 7B) wireless-communication-connected with the electronic device 101, the electronic device 101 may perform the wireless communication connection with one (e.g., the AP4 704 of FIG. 7B) of the at least one second AP by using credential information. For example, the electronic device 101 may obtain at least one of an RSSI value or a CU value for each of the at least one second AP. The electronic device 101 may select an AP that is to wireless-communication-connected from among the at least one second AP, by using at least one of the obtained RSSI value or CU value for each of the at least one second AP. The electronic device 101 may perform the wireless communication connection with the AP selected from among the at least one second AP.

Referring to FIG. 7B, the electronic device 101 may perform a wireless communication connection with the AP4 704 based on the RSSI value, when the electronic device 101 is located in a location where the coverage of the AP3 703 and the coverage of the AP4 704 overlap each other. In another example, even for the RSSI value of the AP4 704 that is greater than the RSSI value of the AP3 703, when the electronic device 101 determines that utilization of the channel 11 associated with the AP4 704 is higher based on the CU value for the AP4 704, the electronic device 101 may perform a wireless communication connection with the AP3 703 having the smaller RSSI value. In another example, the electronic device 101 may select an AP that is to wireless-communication-connected, based on the RSSI values and the CU values of the AP3 703 and the AP4 704.

In operation 820, the electronic device 101 may receive the list of the third channels associated with the at least one fourth AP (e.g., the AP2 702, the AP3 703, the AP5 705, and the AP6 706 of FIG. 7B) having coverages overlapping a wireless-communication-connected AP (e.g., the AP4 704 of FIG. 7B) in operation 810 among the plurality of APs using the identical credential information. Referring to FIG. 7B, the electronic device 101 may receive the list of the third channels associated with the AP2 702, the AP3 703, the AP5 705, and the AP6 706 having the coverages overlapping the wireless-communication-connected AP4 704. The list of the third channels may include information about the channel 36, the channel 48, the channel 6, and the channel 149 that are associated with the AP2 702, the AP3 703, the AP5 705, and the AP6 706. In another example, the list of the third channels may further include information about the channel 11 associated with the AP4 704.

In operation 830, the electronic device 101 may update the list of the first channels by using the received list of the third channels. As the electronic device 101 performs a wireless communication connection with one (e.g., the AP4 704 of FIG. 7B) of the at least one second AP in operation 810 and a wireless communication connection with the first AP (e.g., the AP1 701 of FIG. 7B) is released, the electronic device 101 may update the list of the first channels, which is a list of channels used for existing roaming based on the currently connected AP (e.g., the AP4 704 of FIG. 7B), by using the list of the third channels.

According to various embodiments of the present disclosure, the electronic device 101 may compare the list of the first channels with the list of the third channels, identify channels that are not included in the list of the first channels from among the third channels included in the list of the third channels, and add the identified channels to the list of the first channels, thereby updating the list of the first channels. In another example, the electronic device 101 may update the list of the third channels by using the list of the first channels in the same manner.

Referring to FIG. 7B, the list of the first channels may include information about the channel 1, the channel 36, the channel 48, and the channel 11, and the list of the third channels may include information about the channel 36, the channel 48, the channel 6, and the channel 149. The electronic device 101 may determine that the channels 6 and 149 included in the list of the third channels are not included in the list of the first channels, and add the information about the channels 6 and 149 to the list of the first channels. Thus, the list of the first channels may be updated to include information about the channel 1, the channel 36, the channel 48, the channel 11, the channel 6, and the channel 149. The updated list of the first channels may be used when the electronic device 101 performs roaming later.

According to various embodiments of the present disclosure, the electronic device 101 may further receive the list of the second channels associated with the at least one third AP (e.g., the AP5 705 and the AP6 706 of FIG. 7B) that does not have coverages overlapping that of the first AP (e.g., the AP2 702 of FIG. 7B). When information included in the list of the first channels and the list of the second channels is identical to information about channels included in the list of the third channels, the electronic device 101 may not update the channel list.

Figure 9:
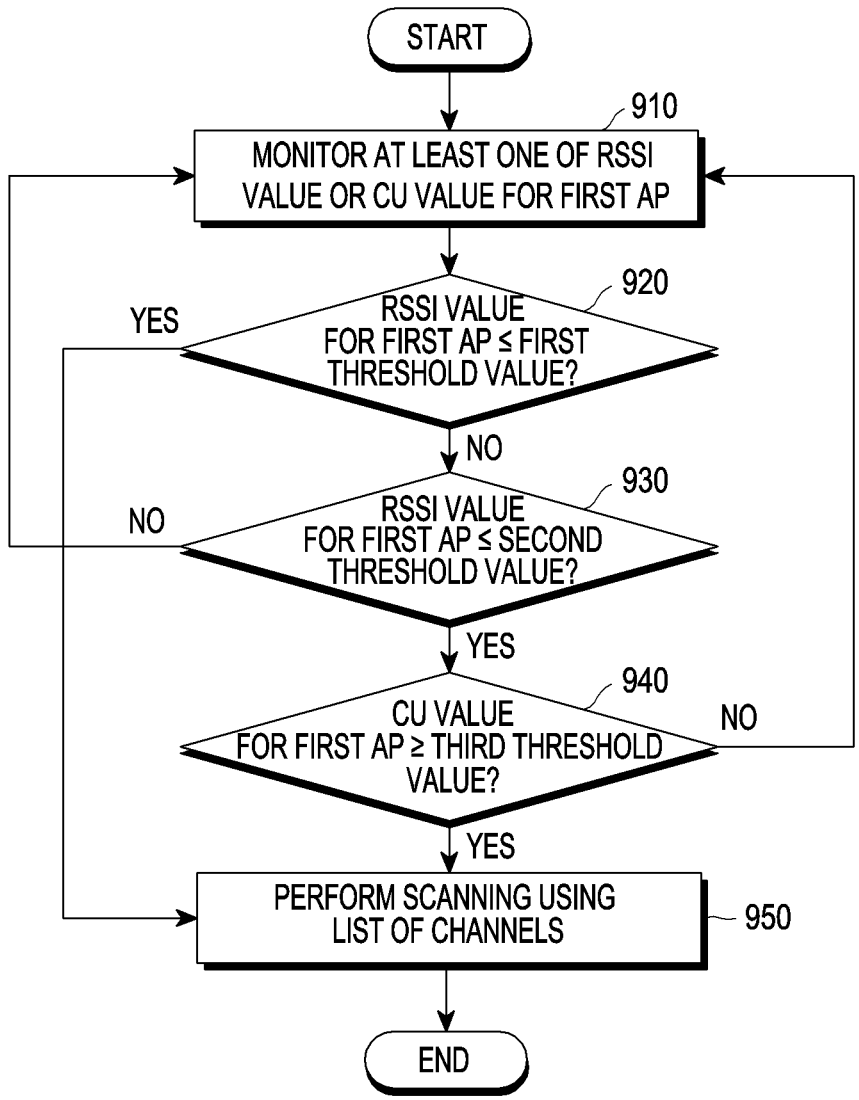
FIG. 9 is a flowchart illustrating a method of determining whether to perform scanning for roaming by an electronic device, according to various embodiments of the present disclosure.

FIG. 9 is a flowchart illustrating a method of determining whether to perform scanning for roaming by an electronic device, according to various embodiments of the present disclosure.

In operation 910, the processor (e.g., the processor 120) of the electronic device 101 (e.g., the electronic device 101 of FIG. 1 and the electronic device 201 of FIG. 2) may monitor at least one of the RSSI value or the CU value for the first AP after performing the wireless communication connection with the first AP (e.g., the AP 400 of FIG. 4). For example, the electronic device 101 may monitor at least one of the RSSI value or the CU value for the first AP by obtaining at least one of the RSSI value or the CU value for the first AP according to a designated period.

In another example, the processor may continuously monitor the CU value for the first AP after performing the wireless communication connection with the first AP, or monitor the CU value for the first AP when the RSSI for the first AP satisfies a designated condition.

For example, the processor may continuously monitor the CU value for the first AP after performing a wireless communication connection with the first AP regardless of the RSSI value for the first AP.

In another example, in operation 920, the processor may identify the CU value for the first AP by performing monitoring with respect to the CU value for the first AP, when the RSSI for the first AP exceeds a designated first threshold value.

In another example, in operation 930, the processor may identify the CU value for the first AP by performing monitoring with respect to the CU value for the first AP, when the RSSI for the first AP exceeds the designated first threshold value and is less than or equal to a designated second threshold value.

In operation 920, the processor may determine whether the RSSI value for the first AP is less than or equal to the designated first threshold value (e.g., −75 dBm). For example, the electronic device 101 may determine whether the electronic device 101 is out of the coverage of the first AP, by determining whether the RSSI value for the first AP is less than or equal to the first threshold value.

In operation 950, the processor may perform scanning with respect to an AP to which roaming is possible, to perform roaming, when the RSSI value for the first AP is less than or equal to the first threshold value. When the RSSI value for the first AP is less than or equal to the first threshold value, the electronic device 101 may determine that the electronic device 101 is out of the coverage of the first AP and perform scanning with respect to an AP to which roaming is possible, by using a channel list.

In operation 930, the processor may determine whether the RSSI value for the first AP is less than or equal to the designated second threshold value (e.g., −65 dBm). For example, when the RSSI value for the first AP exceeds the first threshold value and thus the electronic device 101 determines that the electronic device 101 is not out of the coverage of the first AP, the processor may perform scanning with respect to an AP to which roaming is possible, based on the RSSI value for the first AP. Even when the electronic device 101 is not out of the coverage of the first AP, the electronic device 101 may compare the RSSI value for the first AP with the first threshold value and the second threshold value to determine whether to perform scanning with respect to an AP to which roaming is possible.

In operation 940, the processor may determine whether the CU value for the first AP is greater than or equal to the designated third threshold value (e.g., about 70%) when the RSSI value for the first AP exceeds the first threshold value and is less than or equal to the second threshold value. For example, when the RSSI value for the first AP is less than or equal to the second threshold value, the processor may determine whether to perform scanning with respect to an AP to which roaming is possible, based on a complexity of a channel associated with the first AP, even when the electronic device 101 is not out of the coverage of the first AP. For example, the processor may determine the complexity of the channel associated with the first AP by determining whether the CU value for the first AP is greater than the third threshold value. For example, when the RSSI value for the first AP exceeds the first threshold value and is less than or equal to the second threshold value, the electronic device 101 may perform scanning with respect to an AP to which roaming is possible, by determining the complexity of the channel associated with the first AP, even when the electronic device 101 is not out of the coverage of the first AP. For example, the electronic device 101 may determine the complexity of the channel, the usability of the channel, etc., by further using a bandwidth, an MCS index, and/or an RSSI value.

In operation 950, the processor may perform scanning with respect to an AP to which roaming is possible, to perform roaming, by using the channel list, when the CU value for the first AP is greater than or equal to the third threshold value. When the CU value for the first AP is greater than the third threshold value, the electronic device 101 may determine that the complexity of the channel associated with the first AP increases, and perform scanning with respect to an AP to which roaming is possible, by using the channel list even when the electronic device 101 is not out of the coverage of the first AP.

Figure 10A:
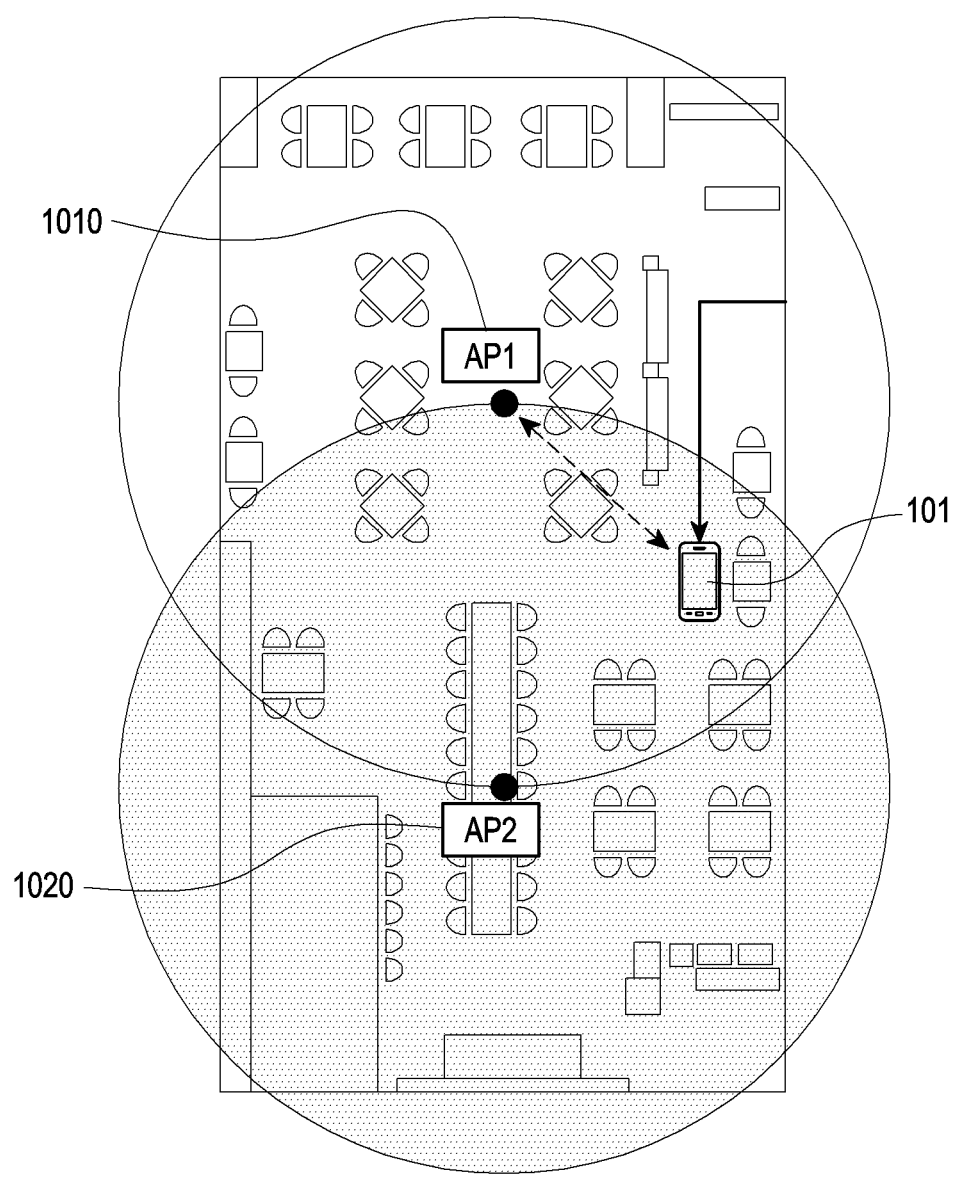
FIGS. 10A and 10B are views for describing a method of determining whether to perform scanning for roaming by an electronic device, according to various embodiments of the present disclosure.
Figure 10B:
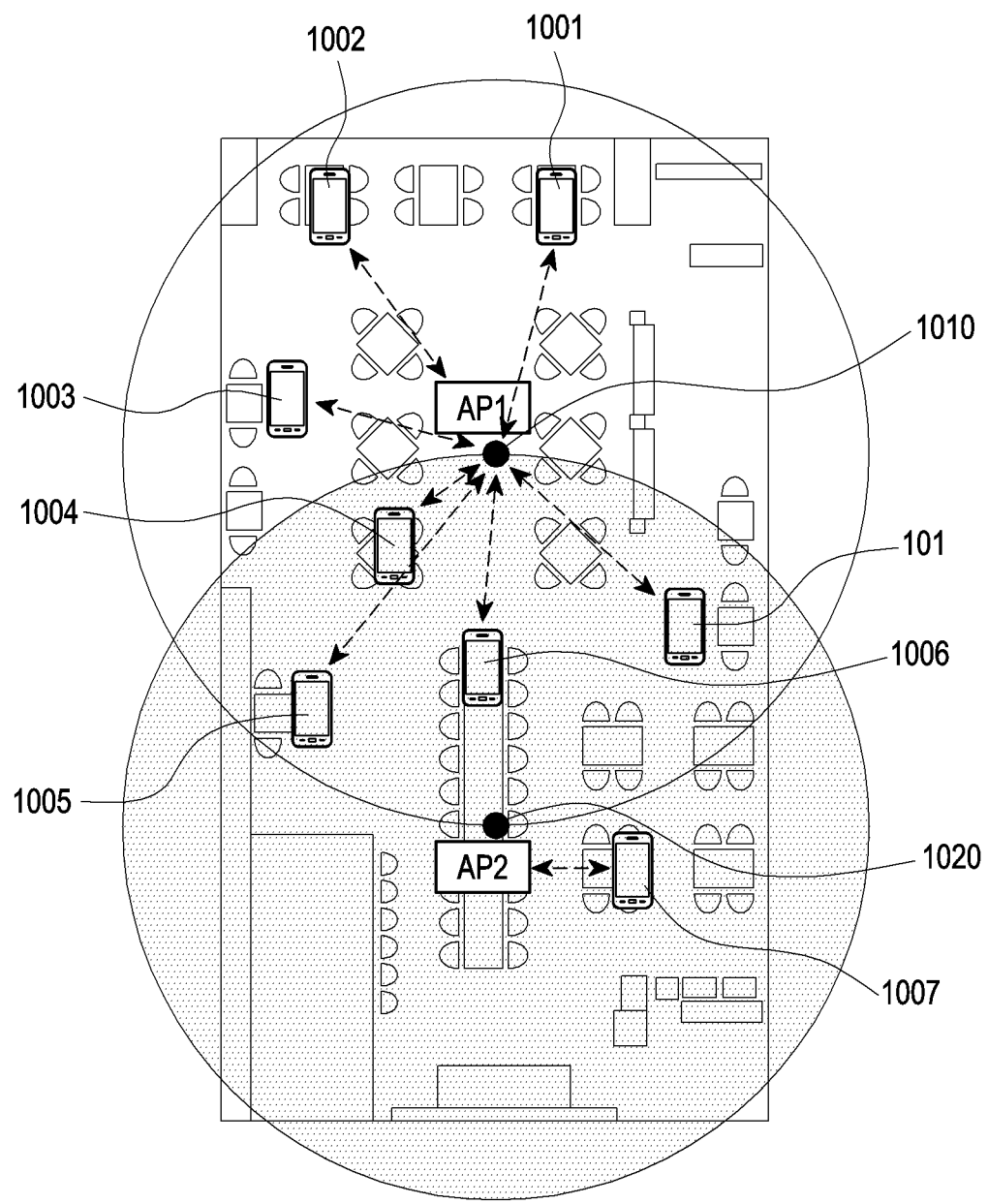

FIGS. 10A and 10B are views for describing a method of determining whether to perform scanning for roaming by an electronic device, according to various embodiments of the present disclosure.

As shown in FIG. 10A, when a first AP 1010 (e.g., the AP 400 of FIG. 4) and a second AP 1020 (e.g., the AP 400 of FIG. 4) using identical credential information are installed in a cafe, the electronic device 101 may perform full scanning through all available channels through a wireless communication connection when the electronic device 101 (e.g., the electronic device 101 of FIG. 1 or the electronic device 201 of FIG. 2) enters the cafe. The electronic device 101 may perform the wireless communication connection with one of the AP1 1010 and the AP2 1020 found as a result of the full scanning. When another electronic device does not exist in a cafe as shown in FIG. 10A, the electronic device 101 may select an AP that is to be wireless-communication-connected based on the RSSI values of the AP1 1010 and the AP2 1020. For example, based on the RSSI values of the AP1 1010 and the AP2 1020, the electronic device 101 may perform the wireless communication connection with the AP1 1010 having the greater RSSI value between the AP1 1010 and the AP2 1020.

As shown in FIG. 10B, after the electronic device 101 performs the wireless communication connection with the AP1 1010, other electronic devices 1001, 1002, 1003, 1004, 1005, and 1006 may enter the coverage of the AP1 1010 and may perform the wireless communication connection with the AP1 1010. As the other electronic devices 1001 perform the wireless communication connection with the AP1 1010, data transmitted and received through a channel associated with the AP1 1010 increases and thus a CU value for the AP1 1010 may increase. When the electronic device 101 considers an RSSI value without considering a CU value to determine whether to perform scanning for roaming, the electronic device 101 continuously maintains the wireless communication connection with the AP1 1010, reducing the speed of data transmission and reception through the channel associated with the AP1 1010.

According to various embodiments of the present disclosure, the electronic device 101 may determine whether to perform scanning for roaming through the CU value for the AP1 1010 even when the RSSI value for the AP1 1010 does not satisfy a condition for performing scanning for roaming. For example, as shown in FIG. 10B, when the RSSI value for the AP1 1010 exceeds the designated first threshold value and is less than or equal to the designated second threshold value, and the CU value for the AP1 1010 is greater than or equal to the designated threshold value, the electronic device 101 may perform scanning with respect to APs to which roaming is possible, by using a channel list for roaming. The electronic device 101 may find the AP2 1020 as a result of scanning and perform a wireless communication connection with the AP2 1020, thus performing roaming. As shown in FIG. 10B, the AP2 1020 has performed the wireless communication connection only with another electronic device 1007, and thus a CU value for the AP2 1020 may be less than the CU value for the AP1 1010. In this way, the electronic device 101 performs roaming from the AP1 1010 to the AP2 1020, such that the speed of data transmission and reception may not be reduced.

Figure 11A:
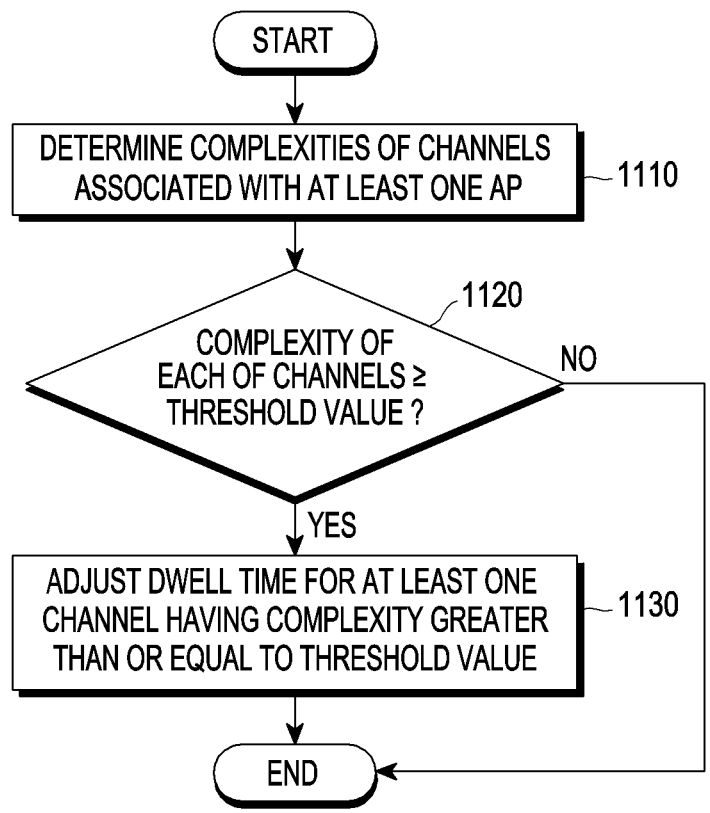
FIGS. 11A and 11B are flowcharts illustrating a method of adjusting a dwell time by an electronic device, according to various embodiments of the present disclosure.
Figure 11B:
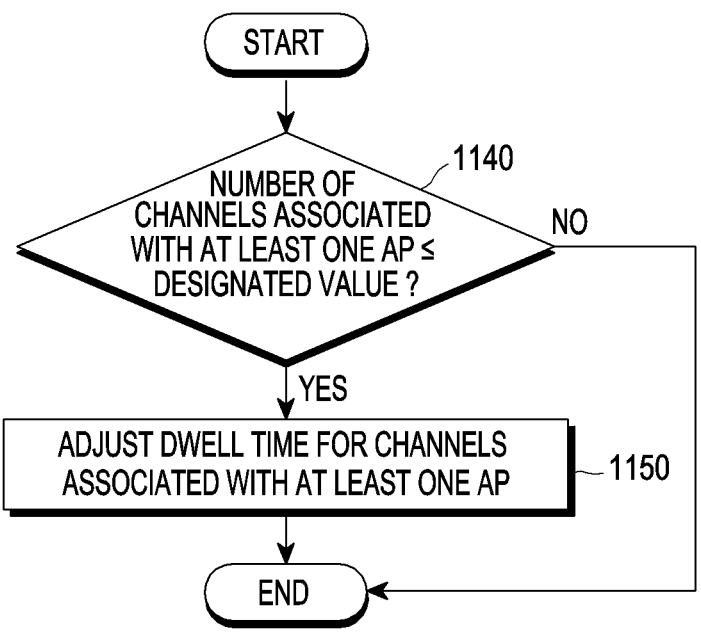

FIGS. 11A and 11B are flowcharts illustrating a method of adjusting a dwell time by an electronic device, according to various embodiments of the present disclosure.

FIG. 11A is a flowchart of a method of adjusting a dwell time for at least one channel among channels associated with at least one AP for which scanning is to be performed, according to various embodiments of the present disclosure.

In operation 1110, the processor (e.g., the processor 120) of the electronic device 101 (e.g., the electronic device 101 of FIG. 1 and the electronic device 201 of FIG. 2) may determine complexities of channels associated with at least one AP (e.g., the AP 400 of FIG. 4) to which roaming is possible, by using a received channel list. For example, the electronic device 101 may determine the complexities of the channels associated with the at least one AP by identifying the degree of use of the channels or a time during which the channels are occupied.

In operation 1120, the processor may determine whether the determined complexities of the channels associated with the at least one AP are greater than a designated threshold value. For example, the processor may determine that at least one channel having a complexity greater than or equal to the threshold value among the channels associated with the at least one AP is a complex channel that is used by a large amount or occupied for a long time.

In operation 1130, the processor may adjust a dwell time for at least one of the channels associated with the at least one channel having the complexity greater than or equal to the threshold value among the channels associated with the at least one AP. For example, the electronic device 101 may increase the dwell time for the at least one channel determined to be complex.

FIG. 11B is a flowchart of a method of adjusting a dwell time for all channels associated with at least one AP to which roaming is possible, according to various embodiments of the present disclosure.

In operation 1140, the processor (e.g., the processor 120) of the electronic device 101 (e.g., the electronic device 101 of FIG. 1 and the electronic device 201 of FIG. 2) may determine whether the number of channels associated with the at least one AP to which roaming is possible is less than or equal to a designated value, by using a received channel list.

In operation 1150, the processor may adjust the dwell time for the channels associated with the at least one AP, when the number of channels associated with the at least one AP to which roaming is possible is less than or equal to the designated value. For example, the electronic device 101 may increase the dwell time for the channels associated with the at least one AP.

Figure 12C:
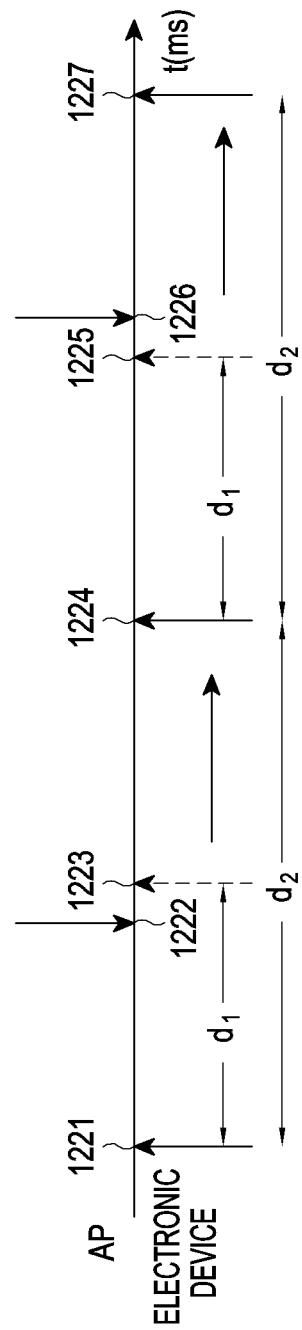

FIGS. 12A through 12C are views for describing adjustment of a dwell time by an electronic device, according to various embodiments of the present disclosure.

For convenience of a description, it is assumed in FIGS. 12A through 12C that an AP1 is associated with a channel 6, an AP2 is associated with a channel 11, an AP3 is associated with a channel 36, and an AP4 is associated with a channel 100.

As shown in FIG. 12A, the electronic device (e.g., the electronic device 101 of FIG. 1 or the electronic device 201 of FIG. 2) according to an embodiment of the present disclosure may apply a fixed dwell time to channels associated with APs (e.g., the AP 400 of FIG. 4) to which roaming is possible. For example, the electronic device may send a probe request through the channel 6 at a time point 1201 and wait for a fixed dwell time $d_1$ (e.g., 40 ms) to receive a probe response from the AP1 associated with the channel 6. The electronic device may find the AP1 when receiving the probe response from the AP1 through the channel 6 within the fixed dwell time $d_1$. For example, the dwell time may be fixed to a value determined according to which roaming is performed, or may be fixed to a value differing according to passive scanning or active scanning.

The electronic device may send a probe request through the channel 11 at a time point 1203, and find the AP2 upon receiving a probe response from the AP2 associated with the channel 11 at a time point 1204 within the fixed dwell time $d_1$.

The electronic device may send a probe request through the channel 36 at a time point 1205 and wait for the fixed dwell time $d_1$ to receive a probe response from the AP3 associated with the channel 36. However, when the AP3 fails to obtain a channel for sending a probe response due to a high complexity of the channel 36 or a load of the AP3 occurs, the probe response sent by the AP3 may not be received in the electronic device within the fixed dwell time. When the electronic device fails to receive the probe response from the AP3 through the channel 36 within the fixed dwell time $d_1$, the electronic device may not find the AP3.

Thereafter, the electronic device may switch from the channel 36 to the channel 100 associated with the AP4 at a time point 1206, and send a probe request through the channel 100. Thus, even when the AP3 sends a probe response through the channel 36 at a time point 1207, the electronic device may not receive the probe response sent by the AP3 through the channel 36 because the electronic device has already switched to the channel 100.

When the fixed dwell time is applied regardless of complexities of channels, at least one of APs to which roaming is possible may not be found. When the unfound AP3 is a sole AP to which roaming of the electronic device is possible, the electronic device needs to perform additional scanning, increasing a time required for scanning. When the unfound AP3 is an AP having the best condition of a wireless communication connection with the electronic device among APs to which roaming is possible, the electronic device may perform the wireless communication connection with another AP having a poorer condition of the wireless communication connection than that of the AP3, increasing a possibility of additional roaming. As a result, the aforementioned data interruption or electric current consumption may occur.

Referring to FIG. 12B, the electronic device 101 according to various embodiments of the present disclosure may adjust a dwell time for at least one of channels associated with the APs to which roaming is possible.

The electronic device 101 may send a probe request through the channels 6 and 11 at time points 1211 and 1213. The electronic device 101 may receive a probe response from the AP1 associated with the channel 6 and the AP2 associated with the channel 11 through the channel 6 and the channel 11 and find the AP1 and the AP2 upon receiving the probe response.

The electronic device 101 may send a probe request through the channel 36 at a time point 1215. The electronic device 101 may determine a complexity of the channel 36. The processor 101 may determine the complexity of the channel 36 by identifying the amount of use of the channel 36, a time for which the channel 36 is occupied, etc.

The electronic device 101 may determine whether the complexity of the channel 36 is greater than or equal to a designated fourth threshold value. When the complexity of the channel 36 is greater than or equal to the designated fourth threshold value, the electronic device 101 may determine that the channel 36 is a complex channel that is used by a large amount or occupied for a long time. Thus, the electronic device 101 may adjust the dwell time for the channel 36 from $d_1$ (e.g., 40 ms) to $d_2$ (e.g., 80 ms). However, this is merely an example for a description, and the electronic device 101 may determine the degree of adjustment for the dwell time depending on the complexity of the channel 36.

By adjusting the dwell time for the channel 36, the electronic device 101 may wait for the adjusted dwell time $d_2$ to receive the probe response from the AP3 without switching from the channel 36 to the channel 100 at a time point 1216.

As shown in FIG. 12B, the electronic device 101 may find the AP3 upon receiving the probe response from the channel 36 from the AP3 at a time point 1217. Thereafter, the electronic device 101 may switch from the channel 36 to the channel 100 at a time point 1218 after an elapse of the adjusted dwell time, and send a probe request through the channel 100.

As the electronic device 101 adjusts a dwell time for a channel based on a complexity of the channel in this way, it is possible to prevent a delay in reception of a probe response, caused by a complex state of the channel or occurrence of a load in an AP, and thus a failure in finding the AP from occurring.

Referring to FIG. 12C, the electronic device 101 according to various embodiments of the present disclosure may adjust a dwell time for all channels associated with the APs to which roaming is possible.

According to an embodiment of the present disclosure, the electronic device 101 may identify the number of channels associated with at least one AP to which roaming is possible, through a list of channels used for roaming. The electronic device 101 may determine whether the identified number of channels associated with the at least one AP is less than or equal to a designated value. The electronic device 101 may adjust the dwell time $d_1$ for all of the channels associated with the at least one AP to $d_2$, when the identified number of channels associated with the at least one AP is less than or equal to the designated value. For example, when the number of channels associated with the at least one AP is identified as 3 and the designated value is 4, the electronic device 101 may adjust the dwell time for all of the channels associated with the at least one AP. The electronic device may, for example, increase the dwell time.

The electronic device 101 may send the probe request through the channel 6 at a time point 1221, may not send the probe request through the channel 11 at a time point 1223 based on an existing dwell time, and send the probe request through the channel 11 at a time point 1224 based on an adjusted dwell time. The electronic device 101 may not send the probe request through the channel 36 at a time point 1225 based on the existing dwell time and may send the probe request through the channel 36 at a time point 1227.

The electronic device 101 may find the first AP upon receiving the probe response from the AP1 through the channel 6 at a time point 1222. The time point 1222 at which the probe response is received from the AP1 falls within the existing dwell time, such that the AP1 may be found without adjustment of the dwell time.

The electronic device 101 may receive the probe response from the AP2 through the channel 11 at a time point 1226 and thus find the AP2. The time point 1226 at which the probe response is received from the AP2 follows the elapse of the existing dwell time, but falls within the adjusted dwell time, such that the AP2 may also be found.

As the electronic device 101 adjusts a dwell time for channels based on the number of channels associated with at least one AP to which roaming is possible, it is possible to prevent a delay in reception of a probe response, caused by a complex state of the channel or occurrence of a load in an AP, and thus a failure in finding the AP from occurring.

Figure 13:
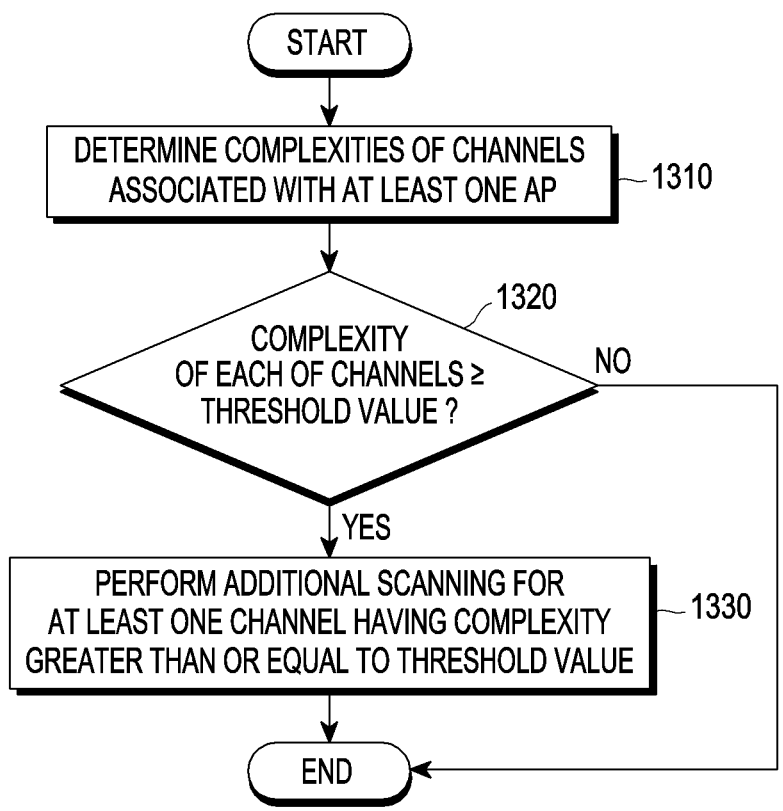
FIG. 13 is a flowchart illustrating a method of performing additional scanning by an electronic device, according to various embodiments of the present disclosure.

FIG. 13 is a flowchart illustrating a method of performing additional scanning by an electronic device, according to various embodiments of the present disclosure.

In operation 1310, the processor (e.g., the processor 120) of the electronic device 101 (e.g., the electronic device 101 of FIG. 1 and the electronic device 201 of FIG. 2) may identify complexities of channels associated with the at least one AP to which roaming is possible, by using a received channel list. For example, the processor may determine the complexities of the channels associated with the at least one AP by identifying the degree of use of the channels or a time during which the channels are occupied.

In operation 1320, the processor may determine whether the determined complexities of the channels associated with the at least one AP are greater than a designated threshold value. For example, the processor may determine that at least one channel having a complexity greater than or equal to a designated threshold value among the channels associated with the at least one AP (e.g., the AP 400 of FIG. 4) is a complex channel that is used by a large amount or occupied for a long time.

In operation 1330, the processor may perform additional scanning with respect to the at least one channel having the complexity greater than or equal to the designated threshold value among the channels associated with the at least one AP.

Figure 14:
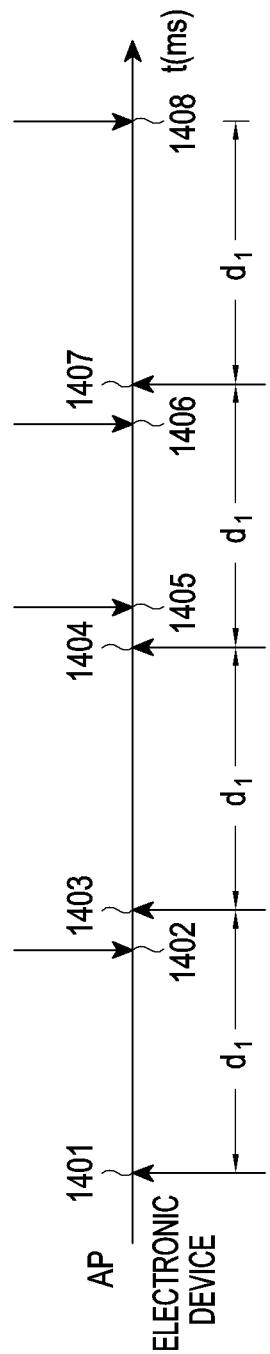
FIG. 14 is a view for describing a method of performing additional scanning by an electronic device, according to various embodiments of the present disclosure.

FIG. 14 is a view for describing a method of performing additional scanning by an electronic device, according to various embodiments of the present disclosure.

Referring to FIG. 14, the electronic device (e.g., the electronic device 101 of FIG. 1 or the electronic device 201 of FIG. 2) according to various embodiments of the present disclosure may perform additional scanning with respect to at least one of the channels associated with APs (e.g., the AP 400 of FIG. 4) to which roaming is possible. For convenience of a description, it is assumed in FIG. 14 that the AP1 is associated with the channel 6, the AP2 is associated with the channel 11, and the AP3 is associated with the channel 36.

The electronic device 101 may send a probe request through the channel 6 at a time point 1401. The electronic device 101 may determine a complexity of the channel 6. The processor 101 may determine the complexity of the channel 6 by identifying the amount of use of the channel 6, a time for which the channel 6 is occupied, etc.

The electronic device 101 may determine whether the complexity of the channel 6 is greater than or equal to a designated threshold value. When the complexity of the channel 6 is greater than or equal to the designated threshold value, the electronic device 101 may determine that the channel 6 is a complex channel. When the electronic device 101 fails to receive the probe response from the AP 1 associated with the channel 6 within the dwell time for the channel 6, the electronic device 101 may determine to perform additional scanning with respect to the channel 6.

Referring to FIG. 14, the electronic device 101 may find the AP1 by receiving the probe response from the AP1 associated with the channel 6 at a time point 1402 within the dwell time for the channel 6. In this case, the electronic device 101 may not perform additional scanning with respect to the channel 6 even when determining the channel 6 to be a complex channel.

The electronic device 101 may switch from the channel 6 to the channel 11 at a time point 1403 and send a probe request through the channel 11. The electronic device 101 may determine a complexity of the channel 11. The electronic device 101 may determine whether the complexity of the channel 11 is greater than or equal to the designated threshold value. When the electronic device 101 fails to receive the probe response from the AP2 associated with the channel 11 within the dwell time for the channel 11, the electronic device 101 may determine to perform additional scanning with respect to the channel 11.

Referring to FIG. 14, the electronic device 101 may switch from the channel 11 to the channel 36 at a time point 1404 after the elapse of the dwell time of the channel 11, and send a probe request through the channel 36. Thus, even when the AP2 sends a probe response through the channel 11 at a time point 1405, the electronic device 101 may not receive the probe response sent by the AP2 through the channel 11 because the electronic device 101 has already switched to the channel 36. The electronic device 101 may then determine to perform additional scanning with respect to the channel 11. The electronic device 101 may receive a probe response from the AP3 associated with the channel 36 through the channel 36 at a time point 1406 within the dwell time of the channel 36 and thus find the AP3.

The electronic device 101 may re-send the probe request through the channel 11 at a time point 1407 following completion of scanning through channels included in a received channel list.

As shown in FIG. 14, the electronic device 101 may receive a probe response from the AP2 through the channel 11 at a time point 1408 within the dwell time of the channel 11 in response to the probe request sent through the channel 11 at the time point 1407, and thus find the AP2.

As the electronic device 101 performs additional scanning with respect to a channel based on a complexity of the channel in this way, it is possible to prevent a delay in reception of a probe response, caused by a complex state of the channel or occurrence of a load in an AP, and thus a failure in finding the AP from occurring.

Figure 15:
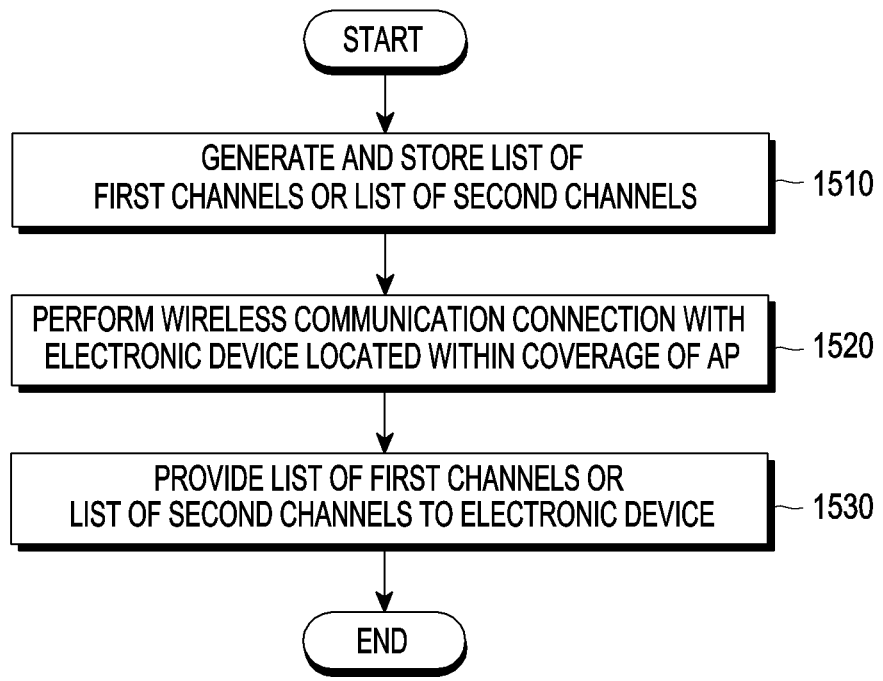
FIG. 15 is a flowchart illustrating a method of providing a list of channels by an AP, according to various embodiments of the present disclosure.

FIG. 15 is a flowchart illustrating a method of providing a list of channels by an AP, according to various embodiments of the present disclosure.

In operation 1510, a wireless communication circuit (e.g., the wireless communication circuit 410) of an AP (e.g., the AP 400 of FIG. 4) may generate and store a list of first channels at least partially associated with at least one first AP (e.g., the AP 400 of FIG. 4) having a coverage overlapping that of the AP 400 among a plurality of APs (e.g., the AP 400 of FIG. 4) using identical credential information at a time point. The wireless communication circuit may receive information about the first channels at least partially associated with the at least one first AP from the at least one first AP. In another example, the wireless communication circuit may receive information about the first channels from another electronic device (e.g., a WLC) or a server that manages the plurality of APs.

According to various embodiments of the present disclosure, the wireless communication circuit may generate the list of the first channels by using the received information about the first channels and store the generated list of the first channels.

According to various embodiments of the present disclosure, the wireless communication circuit may generate and store the list of the second channels at least partially associated with at least one second AP (e.g., the AP 400 of FIG. 4) that does not have a coverage overlapping that of the AP 400 among the plurality of APs. The wireless communication circuit may receive information about the second channels at least partially associated with at least one second AP located within a designated distance from the location of the AP 400, even when the at least one second AP does not have the coverage overlapping that of the AP 400. The wireless communication circuit may generate the list of the second channels by using the received information about the second channels and store the generated list of the second channels.

In operation 1520, the wireless communication circuit may perform a wireless communication connection with an electronic device (e.g., the electronic device 101 of FIG. 1 or the electronic device 201 of FIG. 2) located in the coverage of the AP 400.

In operation 1530, the wireless communication circuit may provide the stored list of the first channels or the stored list of the second channels to the wireless-communication-connected electronic device 101. For example, the wireless communication circuit may provide the list of the first channels or the list of the second channels to the electronic device 101 at the request of the electronic device 101. In another example, the wireless communication circuit may provide the list of the first channels or the list of the second channels to the electronic device 101 without a separate request, as a wireless communication connection with the electronic device 101 is performed.

FIGS. 16A through 16D are flowcharts illustrating a method of providing a list of channels between an AP and an electronic device, according to various embodiments of the present disclosure.

Figure 16A:
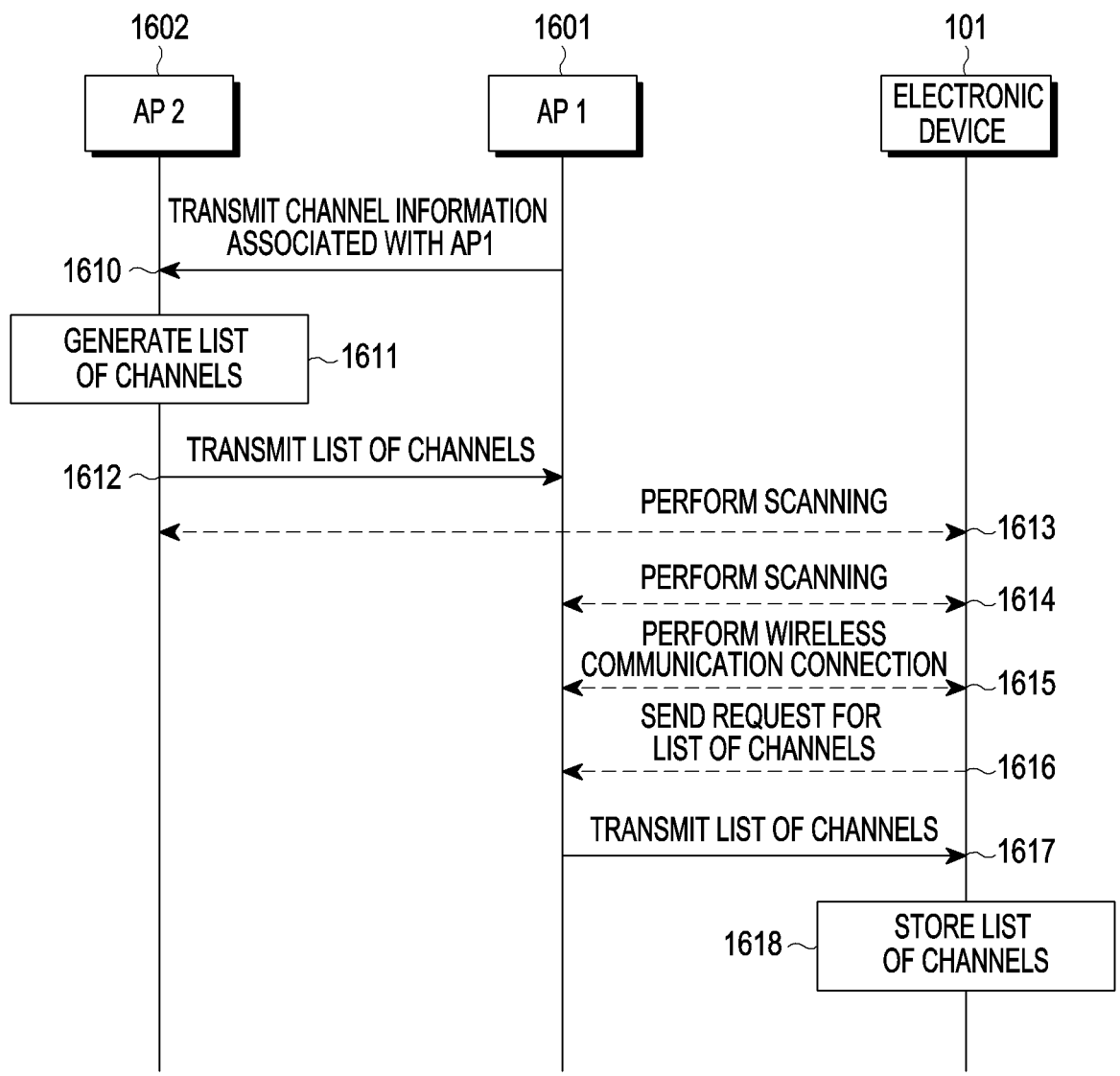
FIGS. 16A through 16D are flowcharts illustrating a method of providing a list of channels between an AP and an electronic device, according to various embodiments of the present disclosure.

Referring to FIG. 16A, in operation 1610, an AP1 1610 (e.g., the AP 400 of FIG. 4) may transmit channel information associated with the AP1 1601 to an AP2 1602 (e.g., the AP 400 of FIG. 4). The AP1 1601 may further transmit information about the AP1 1601. The AP1 1601 and the AP2 1602 may use identical credential information.

In operation 1611, the AP2 1602 may generate a list of channels associated with the AP1 1601 and the AP2 1602, based on at least one of the channel information associated with the AP1 1601 or the information about the AP1 1601, which is received from the AP1 1601.

In operation 1612, the AP2 1602 may transmit the generated list of the channels associated with the AP1 1601 and the AP2 1602 to the AP1 1601. The AP1 1601 may store the received list of the channels associated with the AP1 1601 and the AP2 1602 received from the AP2 1602.

In operations 1613 and 1614, the electronic device 101 (e.g., the electronic device 101 of FIG. 1 or the electronic device 201 of FIG. 2) may perform scanning with respect to at least one connectable AP to perform a wireless communication connection.

In operation 1615, the electronic device 101 may perform the wireless communication connection with one of the AP 11601 and the AP2 1602 found as a result of the scanning.

In operation 1616, the electronic device 101 may send a request for a list of channels used to perform roaming to the wireless-communication-connected AP1 1601.

In operation 1617, the AP1 1601 may send the stored list of the channels associated with the AP1 1601 and the AP2 1602 to the electronic device 101, in response to the request sent from the electronic device 101.

In operation 1618, the electronic device 101 may store the list of the channels associated with the AP1 1601 and the AP2 1602 received from the AP1 1601. When generating the list of the channels in operations 1613 and 1614, the electronic device 101 may update the generated list of the channels by using the received list of the channels associated with the AP1 1610 and the AP2 1602.

Figure 16B:
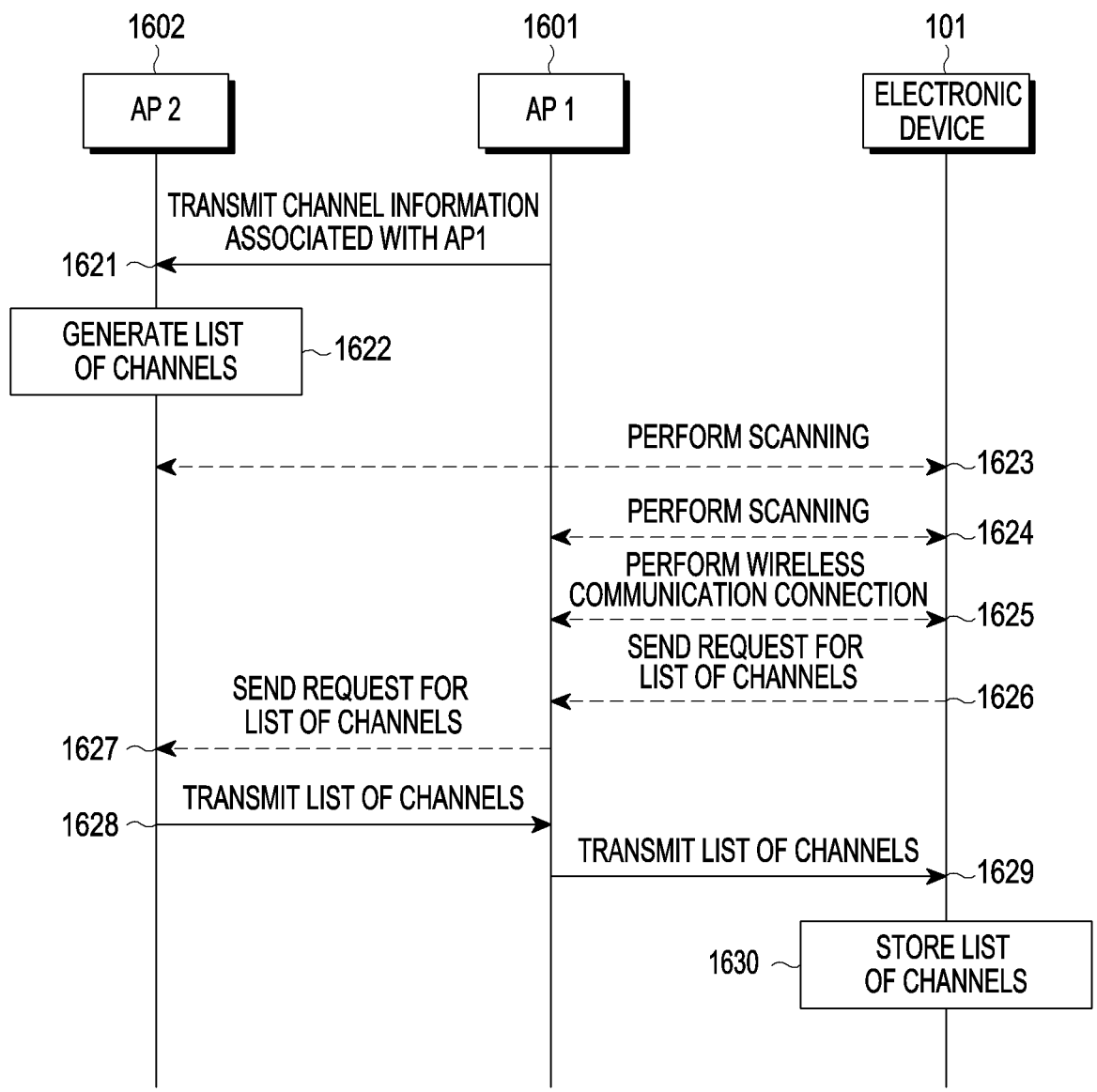

Referring to FIG. 16B, in operation 1621, the AP1 1601 may transmit channel information associated with the AP1 1601 to the AP2 1602. The AP1 1601 may further transmit information about the AP1 1601 to the AP2 1602.

In operation 1622, the AP2 1602 may generate a list of channels associated with the AP1 1601 and the AP2 1602, based on at least one of the channel information associated with the AP 11601 or the information about the AP 11601, which is received from the AP1 1601.

In operations 1623 and 1624, the electronic device 101 may perform scanning with respect to at least one connectable AP to perform a wireless communication connection.

In operation 1625, the electronic device 101 may perform the wireless communication connection with one of the AP 11601 and the AP2 1602 found as a result of the scanning.

In operation 1626, the electronic device 101 may send a request for a list of channels used to perform roaming to the wireless-communication-connected AP1 1601.

In operation 1627, the AP1 1601 may send a request for the list of the channels to the AP2 1602 because the AP1 1601 does not store the list of the channels.

In operation 1628, the AP2 1602 may send the generated list of the channels associated with the AP1 1601 and the AP2 1602 to the AP1 1601, in response to the request sent from the AP1 1601.

In operation 1629, the AP1 1601 may send the list of the channels associated with the AP1 1601 and the AP2 1602 received from the AP2 1602 to the electronic device 101.

In operation 1630, the electronic device 101 may store the list of the channels associated with the AP1 1601 and the AP2 1602 received from the AP1 1601.

Referring to FIGS. 16A and 16B, when the AP1 1601 wireless-communication-connected with the electronic device 101 does not self-generate a channel list, the AP1 1601 may receive the channel list from the AP2 1602 that is another AP, and may transmit the received channel list to the electronic device 101.

Figure 16C:
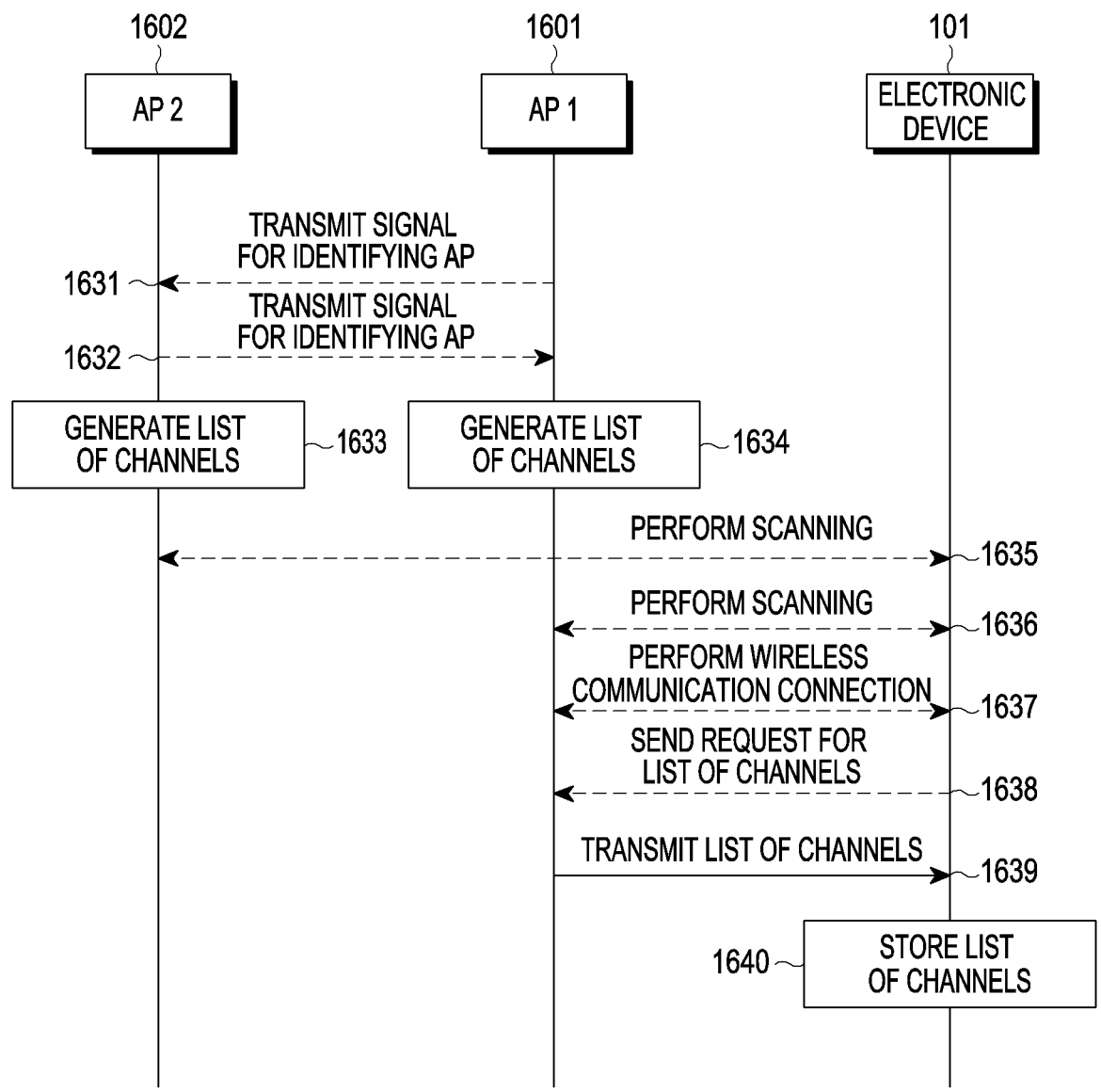

Referring to FIG. 16C, in operation 1631, the AP 11601 may send a signal for identifying an AP located at a close distance. For example, the signal may include at least one of information about a channel associated with the AP1 1601 or information about the AP1 1601.

In operation 1632, the AP2 1602 may send a signal for identifying an AP located at a close distance. The signal may include at least one of information about a channel associated with the AP2 1602 or information about the AP2 1602.

The AP2 1602 may receive a signal sent from the AP1 1601, and generate a list of channels associated with the AP1 1601 and the AP2 1602 based on the information included in the received signal in operation 1633.

The AP 11601 may receive a signal sent from the AP2 1602, and generate a list of channels associated with the AP1 1601 and the AP2 1602 based on the information included in the received signal in operation 1634.

In operations 1635 and 1636, the electronic device 101 may perform scanning with respect to at least one connectable AP to perform a wireless communication connection.

In operation 1637, the electronic device 101 may perform the wireless communication connection with one of the AP 11601 and the AP2 1602 found as a result of the scanning.

In operation 1638, the electronic device 101 may send a request for a list of channels used to perform roaming to the wireless-communication-connected AP1 1601.

In operation 1639, the AP1 1601 may send the generated list of the channels associated with the AP1 1601 and the AP2 1602 to the electronic device 101, in response to the request sent from the electronic device 101.

In operation 1640, the electronic device 101 may store the list of the channels associated with the AP1 1601 and the AP2 1602 received from the AP1 1601.

Figure 16D:
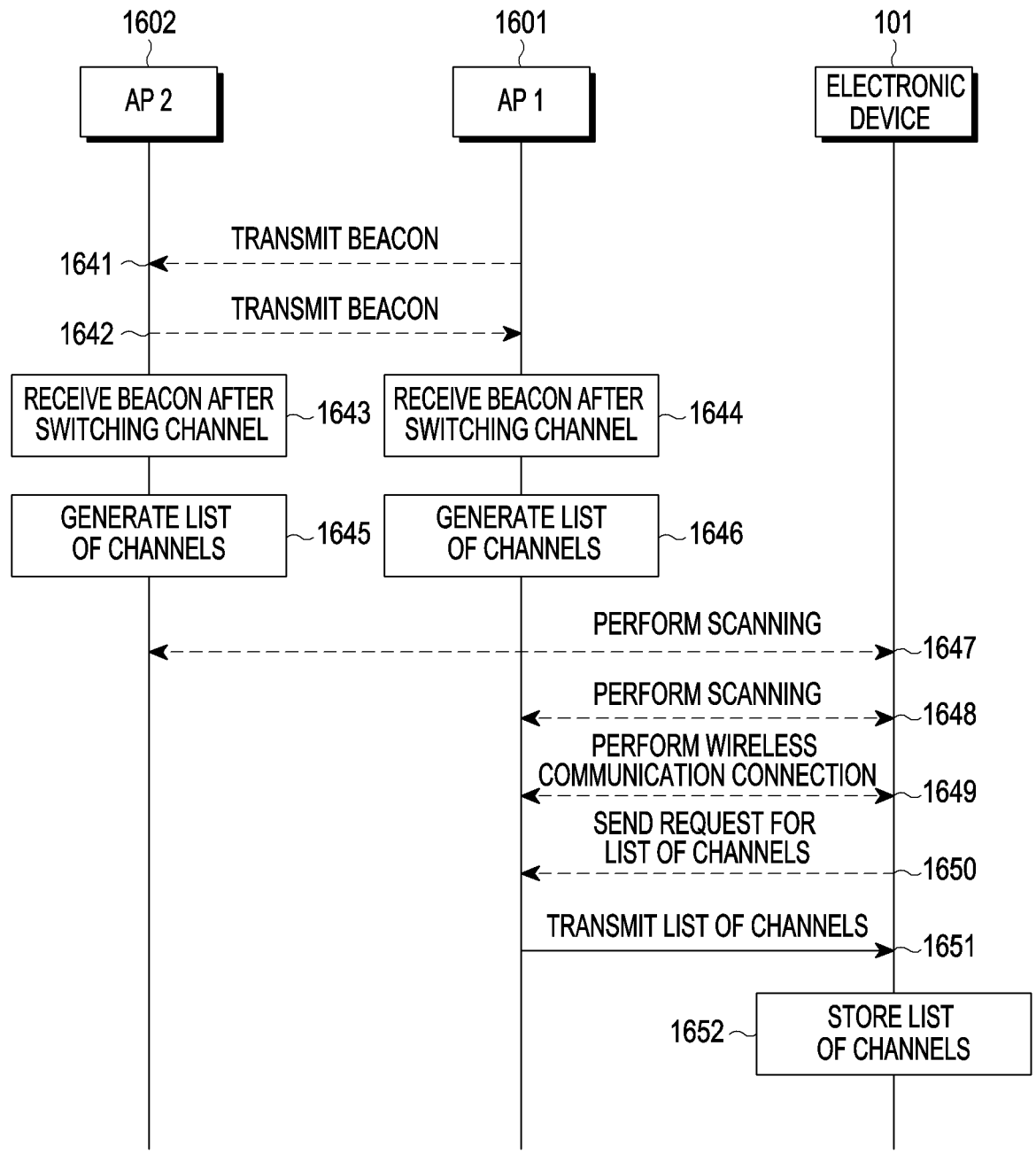

Referring to FIG. 16D, in operation 1641, the AP1 1601 may continuously transmit a beacon for identifying an AP located at a close distance through a channel 1 associated with the AP1 1601. The beacon may include, for example, at least one of information about the channel 1 associated with the AP1 1601 or information about the AP1 1601. In operation 1643, the AP2 1602 may switch to the channel 1 that is one of available channels, and receive the beacon transmitted through the channel 1 from the AP1 1601. The AP2 1602 may receive a beacon sent from the AP1 1601, and generate a list of channels associated with the AP1 1601 and the AP2 1602 based on the information included in the received beacon in operation 1645.

In operation 1642, the AP2 1602 may transmit a beacon for identifying an AP located at a close distance through a channel 2 associated with the AP2 1602. The beacon may include at least one of information about the channel 2 associated with the AP2 1602 or information about the AP2 1602. In operation 1644, the AP1 1601 may switch to the channel 2 that is one of available channels, and receive the beacon transmitted through the channel 2 from the AP2 1602. The AP1 1601 may receive a beacon sent from the AP2 1602, and generate a list of channels associated with the AP1 1601 and the AP2 1602 based on the information included in the received beacon in operation 1646.

In operations 1647 and 1648, the electronic device 101 may perform scanning with respect to at least one connectable AP to perform a wireless communication connection.

In operation 1649, the electronic device 101 may perform the wireless communication connection with one of the AP 11601 and the AP2 1602 found as a result of the scanning.

In operation 1650, the electronic device 101 may send a request for a list of channels used to perform roaming to the wireless-communication-connected AP1 1601.

In operation 1651, the AP1 1601 may send the generated list of the channels associated with the AP1 1601 and the AP2 1602 to the electronic device 101, in response to the request sent from the electronic device 101.

In operation 1652, the electronic device 101 may store the list of the channels associated with the AP1 1601 and the AP2 1602 received from the AP1 1601.

Referring to FIGS. 16C and 16D, when the AP1 1601 wireless-communication-connected with the electronic device 101 may transmit a self-generated channel list to the electronic device 101.

Figure 17A:
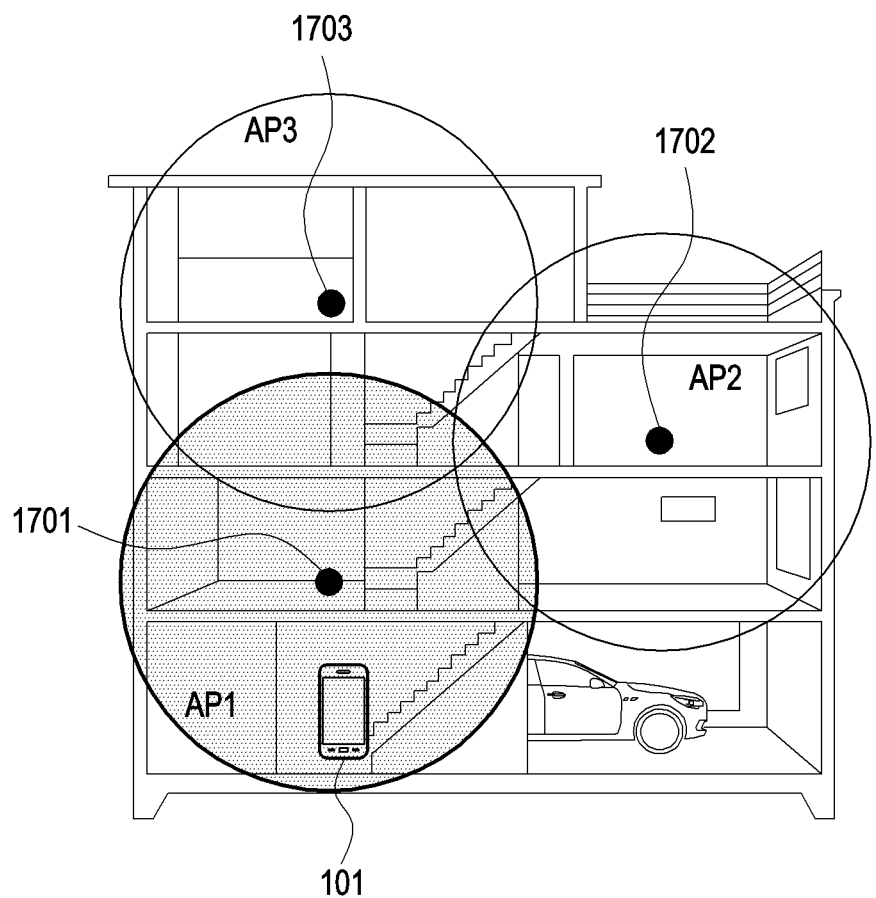
FIGS. 17A and 17B are views for describing a roaming method of an electronic device, according to various embodiments of the present disclosure.
Figure 17B:
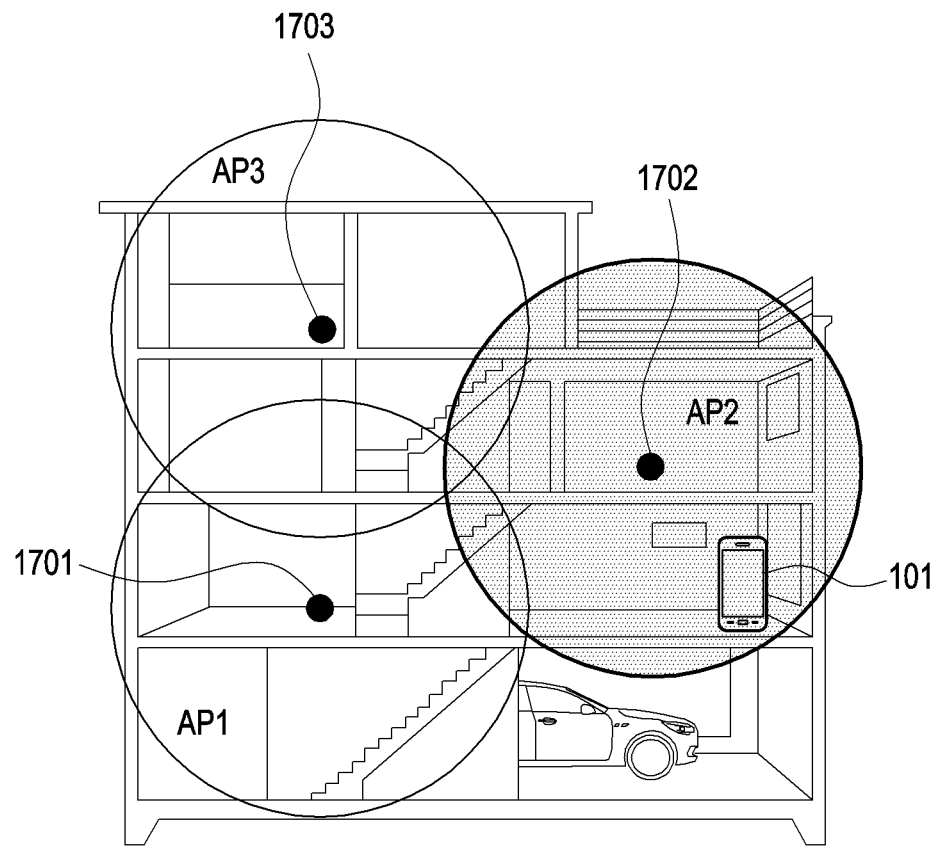

FIGS. 17A and 17B are views for describing a roaming method of an electronic device, according to various embodiments of the present disclosure.

As shown in FIG. 17A, an AP1 1701 (e.g., the AP 400 of FIG. 4), an AP2 1702 (e.g., the AP 400 of FIG. 4), and an AP3 1703 (e.g., the AP 400 of FIG. 4) that use identical credential information may be installed at home. It is assumed that channels associated with the AP1 1701, the AP2 1702, and the AP3 1703 are as shown in Table 2 and the AP1 1701 is a root AP connected to a WAN.

TABLE 2

|  | 2.4 GHz Channel | 5 GHz Channel |
|---|---|---|
| AP1 | 1 | 48 |
| AP2 | 6 | 100 |
| AP3 | 11 | 149 |

Information about channels associated with the AP1 1701, the AP2 1702, and the AP3 1703 as shown in Table 2 may be shared among the AP1 1701, the AP2 1702, and the AP3 1703 after the AP1 1701, the AP2 1702, and the AP3 1703 are initially installed or turned on/off, or may be generated by the AP1 1701 and then delivered to the AP2 1702 and the AP3 1703. As shown in FIG. 17A, when the electronic device 101 (e.g., the electronic device 101 of FIG. 1 or the electronic device 201 of FIG. 2) comes home, the electronic device 101 may be connected to the AP1 1701. After being connected to the AP1 1701, the electronic device 101 may send a request for a channel list to the AP1 1701 that may then deliver the channel list as shown in Table 1 to the electronic device 101.

As shown in Table 17B, once moving to the second floor, the electronic device 101 is out of a coverage of the AP1 1701 and may perform scanning by using the channel list to perform roaming. The electronic device 101 may find the AP2 1702 as an AP to which roaming is to be performed, as a result of the scanning performed using the channel list. The electronic device 101 may perform a wireless communication connection with the found AP2 1702. As such, the electronic device 101 may use the channel list when performing scanning for roaming, thereby avoiding full scanning with respect to all available channels. Thus, data interruption caused by full scanning may be reduced.

Figure 18A:
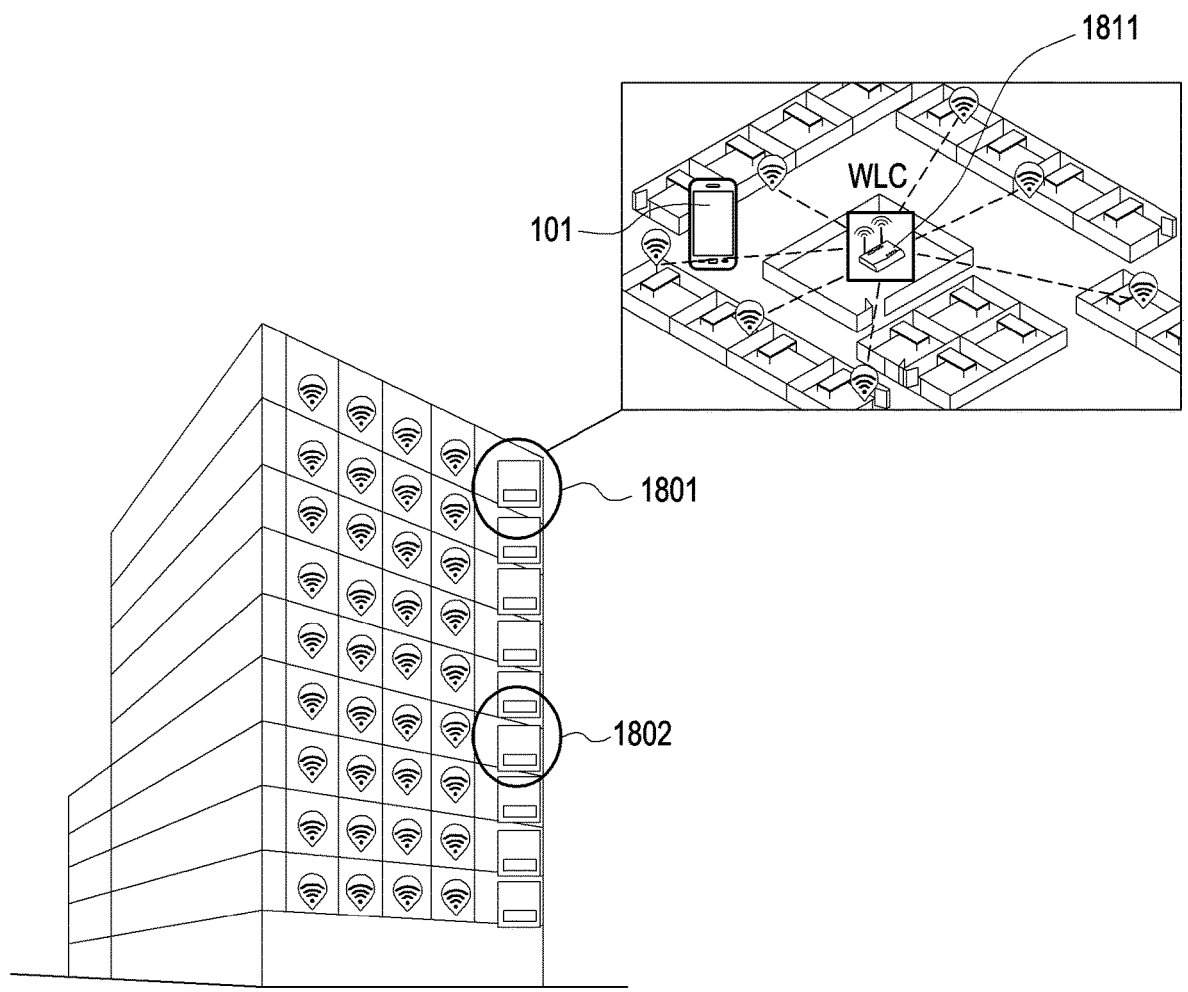
FIGS. 18A and 18B are views for describing a roaming method of an electronic device according to various embodiments of the present disclosure.
Figure 18B:
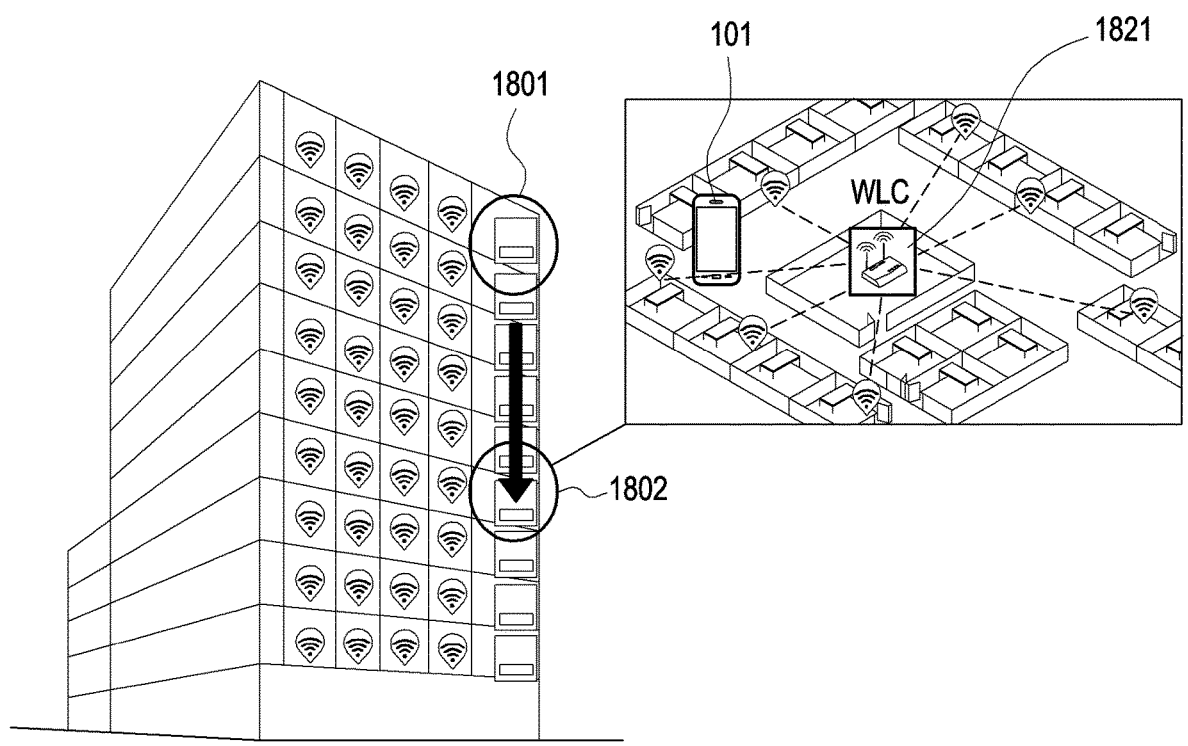

FIGS. 18A and 18B are views for describing a roaming method of an electronic device according to various embodiments of the present disclosure.

As shown in FIGS. 18A and 18B, a plurality of APs (e.g., the AP 400 of FIG. 4) using identical credential information are arranged on each floor of a building, and the plurality of APs arranged in each layer of the building may be managed by each of WLCs 1811 and 1812 arranged on respective floors. It is assumed that in the building shown in FIGS. 18A and 18B, channels as shown in Table 3 are used.

TABLE 3

|  | 2.4 GHz Channel | 5 GHz Channel |
|---|---|---|
| Odd-numbered floor | 1, 6 | 48, 100 |
| Even-numbered floor | 3, 8 | 36, 112 |
| Lobby and elevator in each floor | 11 | 149 |

When a channel as shown in Table 3 is used in the building, a list of channels for roaming may include a list of first channels used in odd-numbered floors of the building and a list of second channels used in even-numbered floors of the building. In another example, information about channels used in a public place of the building, e.g., a lobby and an elevator on each floor may be included in both the list of the first channels and the list of the second channels. For example, the list of the first channels used in an odd-numbered floor of the building may include information about the channel 1, the channel 6, the channel 48, the channel 100, the channel 11, and the channel 149. The list of the second channels used in an even-numbered floor of the building may include information about the channel 3, the channel 8, the channel 36, the channel 112, the channel 11, and the channel 149.

For example, once the electronic device 101 (e.g., the electronic device 101 of FIG. 1 or the electronic device 201 of FIG. 2) enters the building, the electronic device 101 may perform in the first floor of the building, a wireless communication connection with at least one AP among a plurality of APs arranged on the first floor. The electronic device 101 may receive the list of the first channels from the connected at least one AP.

As shown in FIG. 18A, when the electronic device 101 moves to a ninth floor 1801, channels included in the list of the first channels are used in the ninth floor 1801 that is an odd-numbered floor, like in the first floor, such that the electronic device 101 may perform scanning for roaming by using the list of the first channels.

As shown in FIG. 18B, when the electronic device 101 moves to a fourth floor 1802 from the ninth floor 1801, channels included in the list of the second channels may be used in the fourth floor 1802 that is an even-numbered floor, unlike in the first floor and the ninth floor 1801. Thus, the electronic device 101 may receive the list of the second channels from at least one AP arranged on a lobby of the fourth floor 1802. The electronic device 101 may update the list of the first channels by using the list of the second channels. The electronic device 101 may perform scanning for roaming by using the updated list of the first channels. In another example, upon receiving the list of the second channels, the electronic device 101 may perform scanning for roaming by using the list of the second channels without updating the list of the first channels.

According to an embodiment of the present disclosure, even when a channel is used as shown in Table 2 in the building, the list of the channels for roaming may be generated as one channel list. For example, the channel list may include information about the channel 1, the channel 3, the channel 6, the channel 8, the channel 11, the channel 36, the channel 48, the channel 100, the channel 112, and the channel 149. In this case, when the electronic device 101 enters the building, the electronic device 101 may perform in the first floor of the building, a wireless communication connection with at least one of a plurality of APs arranged on the first floor, and receive the channel list from the at least one AP. In another example, the electronic device 101 receives the channel list including information about all channels used in the building, and thus the electronic device 101 may not further receive or update the channel list even when moving to the ninth floor or the fourth floor as shown in FIGS. 18A and 18B.

Figure 19A:
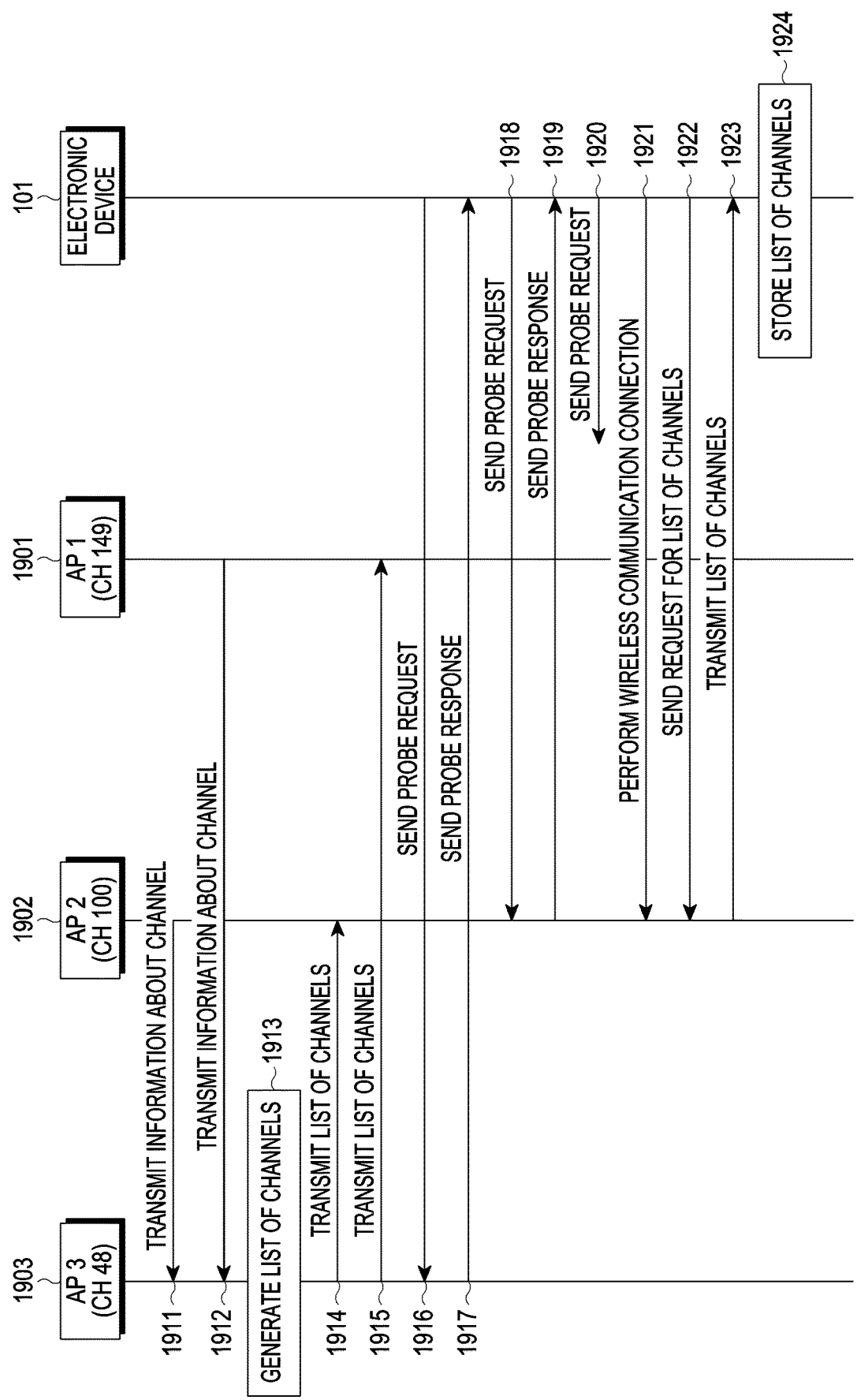
FIGS. 19A and 19B are flowcharts illustrating a roaming method of an electronic device, according to various embodiments of the present disclosure.
Figure 19B:
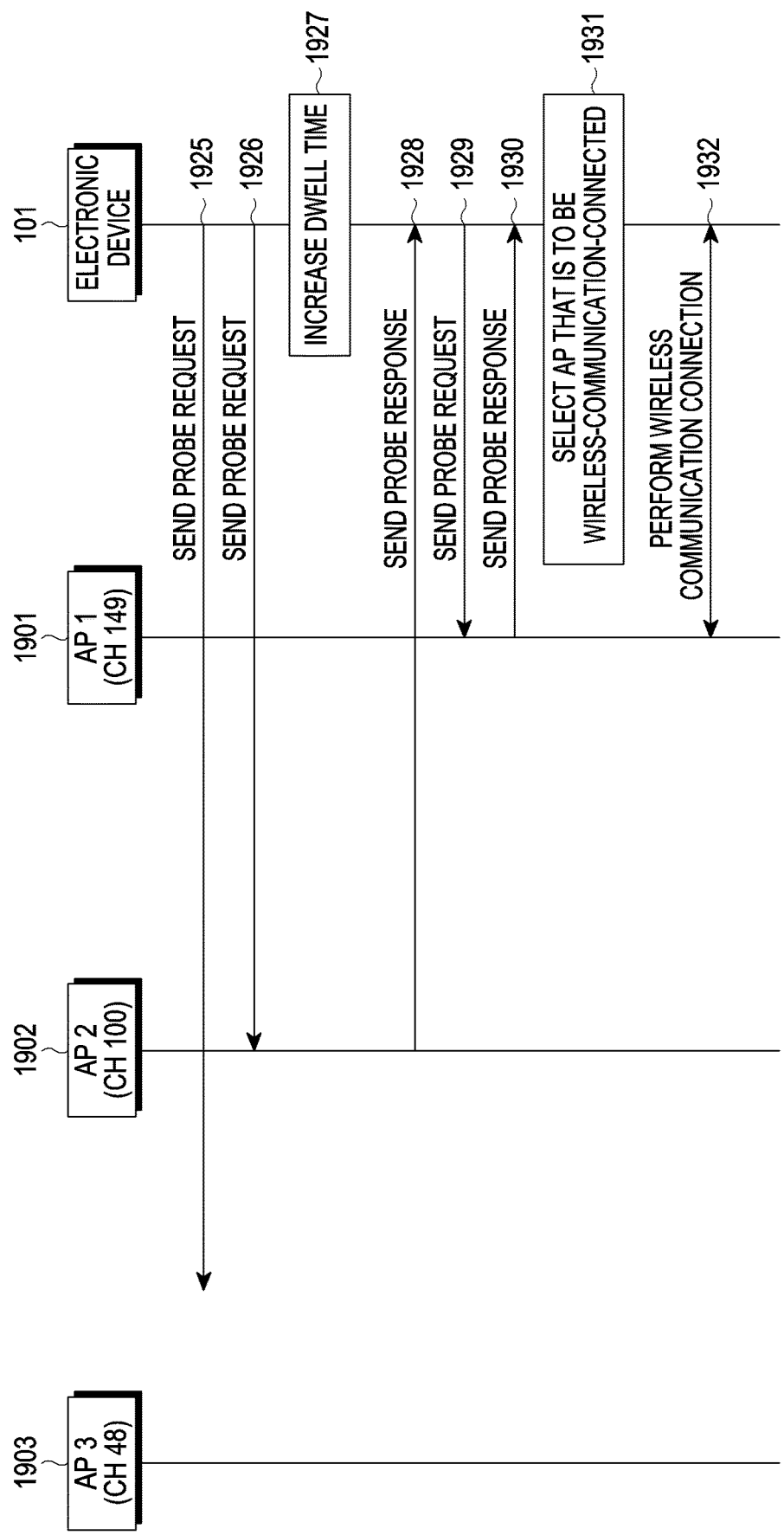

FIGS. 19A and 19B are flowcharts illustrating a roaming method of an electronic device, according to various embodiments of the present disclosure.

Referring to FIG. 19A, in operation 1911, an AP2 1902 (e.g., the AP 400 of FIG. 4) associated with the channel 100 may transmit information about the channel 100 and information about the AP2 1902 to an AP3 1903 (e.g., the AP 400 of FIG. 4) associated with the channel 48.

In operation 1912, an AP1 1901 (e.g., the AP 400 of FIG. 4) associated with the channel 149 may transmit information about the channel 149 and information about the AP1 1901 to the AP3 1903.

In operation 1913, the AP3 1903 may generate a channel list including information about the channel 48, the channel 100, and the channel 149.

In operations 1914 and 1915, the AP3 1903 may transmit the generated channel list to the AP2 1901 and the AP1 1901.

In operation 1916, the electronic device (e.g., the electronic device 101 of FIG. 1 or the electronic device 201 of FIG. 2) may send the probe request through the channel 48. In operation 1917, the AP3 1903 may send the probe response to the electronic device 101 in response to the probe request received through the channel 48.

In operation 1918, the electronic device 101 may send the probe request through the channel 100. In operation 1919, the AP2 1902 may send the probe response to the electronic device 101 in response to the probe request received through the channel 100.

In operation 1920, the electronic device 101 may send the probe request through the channel 149. However, it is assumed that the probe request does not arrive at the AP1 1901 because the electronic device 101 is out of the coverage of the AP1 1901. Thus, the electronic device 101 may not receive the probe response from the AP1 1901 within a designated dwell time for the channel 149 and may not find the AP1 1901.

In operation 1921, the electronic device 101 may perform the wireless communication connection with one of the AP2 1902 and the AP3 1903 having sent the probe response, e.g., the AP2 1902.

In operation 1922, the electronic device 101 may send a request for a list of channels used to perform roaming to the wireless-communication-connected AP2 1902.

In operation 1923, the AP2 1902 may transmit the list of the channels to the electronic device 101.

In operation 1924, the electronic device 101 may store the list of the channels received from the AP2 1902.

The electronic device 101 may perform scanning by using the received list of the channels to perform roaming when a condition of communication with the AP2 1902 is degraded because the electronic device 101 becomes distant from the wireless-communication-connected AP2 1902 or because of other reasons.

Referring to FIG. 19B, in operation 1925, the electronic device 101 may send the probe request through the channel 48. However, it is assumed that the probe request does not arrive at the AP3 1903 because the electronic device 101 is located out of the coverage of the AP3 1903 due to movement thereof. Thus, the electronic device 101 may not receive the probe response from the AP3 1903 within a designated dwell time for the channel 48 and may not find the AP3 1903.

In operation 1926, the electronic device 101 may send the probe request through the channel 100. In operation 1927, the electronic device 101 may determine a complexity of the channel 100 and increase a designated dwell time for the channel 100 when the channel 100 is determined to be in a currently complex condition. In operation 1928, the AP2 1902 may send the probe response in response to the probe request through the channel 100. The electronic device 101 may receive the probe response from the AP2 1902 within an increasing dwell time and may find the AP2 1902.

In operation 1929, the electronic device 101 may send the probe request through the channel 149. In operation 1930, the AP1 1901 may transmit the probe response in response to the probe request through the channel 149.

In operation 1931, the electronic device 101 may select an AP with which a wireless communication connection is to be performed from among the found AP1 1901 and AP2 1902, based on a result of the scanning performed using the list of the channels.

In operation 1932, the electronic device 101 may roam to the AP1 1901 by performing the wireless communication connection with the selected AP 1 1901.

According to various embodiments of the present disclosure, an electronic device may include a wireless communication circuit located inside the housing and configured to support a wireless protocol for a wireless connection, at a time point, with one of a plurality of APs that use identical first credential information, a processor located inside the housing and electrically connected with the wireless communication circuit, and a memory located inside the housing and electrically connected with the processor. The memory may store instructions that cause, when executed, the processor to wirelessly connect to a first AP by using the first credential information, through the wireless communication circuit, to receive a list of first channels at least partially associated with at least one second AP having a coverage overlapping that of the first AP among the plurality of APs, through the wireless communication circuit, and to perform scanning with respect to the at least one second AP that uses the first credential information by using the list of the first channels, through the wireless communication circuit, in which the list of the first channels includes, but not all, a plurality of channels among channels available from the wireless protocol.

According to various embodiments of the present disclosure, the wireless protocol may include a WiFi protocol.

According to various embodiments of the present disclosure, the first credential information may include an SSID or a password.

According to various embodiments of the present disclosure, the instructions may cause the processor to perform scanning with respect to the at least one second AP by using the list of the first channels, through the wireless communication circuit, when an RSSI value for the first AP is less than or equal to a designated first threshold value or when the RSSI value for the first AP exceeds the first threshold value and is less than or equal to a designated second threshold value and a CU value for the first AP is greater than or equal to a designated third threshold value.

According to various embodiments of the present disclosure, the instructions stored in the memory may cause the processor to receive the list of the first channels from the first AP through the wireless communication circuit.

According to various embodiments of the present disclosure, the instructions stored in the memory may cause the processor to further receive a list of second channels associated with at least one third AP that does not have a coverage overlapping that of the first AP among the plurality of APs through the wireless communication circuit.

According to various embodiments of the present disclosure, the memory may further store instructions that cause the processor to perform scanning with respect to the at least one third AP that uses the first credential information by using the list of the second channels through the wireless communication circuit.

According to various embodiments of the present disclosure, the memory may further store an instruction that causes the processor to wirelessly connect to one of the at least one second AP by using the first credential information through the wireless communication circuit after performing scanning with respect to the at least one second AP.

According to various embodiments of the present disclosure, the memory may further store an instruction that causes the processor to obtain at least one of an RSSI value or a CU value for each of the at least one second AP and select the AP that is to be wirelessly connected from among the at least one second AP, by using the at least one of the RSSI value or CU value for each of the at least one second AP.

According to various embodiments of the present disclosure, the memory may further store an instruction that causes the processor to receive a list of third channels associated with at least one fourth AP having a coverage overlapping a coverage of the wirelessly-connected AP among the plurality of APs, through the wireless communication circuit and to update the list of the first channels by using the received list of the third channels.

According to various embodiments of the present disclosure, the memory may further store an instruction that causes the processor to compare the CU value for the at least one second AP with a designated fourth threshold value, to determine at least one AP with respect to which scanning is to be performed, among the at least one second AP, based on a result of the comparison, and to perform scanning with respect to the determined at least one AP.

According to various embodiments of the present disclosure, the memory may further store an instruction that causes the processor to determine complexities of the first channels for the at least one second AP and to adjust a dwell time for at least one channel determined to have a complexity that is greater than or equal to a designated fifth threshold value among the first channels, based on a result of the determination.

According to various embodiments of the present disclosure, the memory may further store an instruction that causes the processor to determine complexities of the first channels for the at least one second AP and to perform additional scanning for at least one channel determined to have a complexity that is greater than or equal to a designated sixth value among the first channels, based on a result of the determination, after completing scanning for the first channels associated with the at least one second AP.

According to various embodiments of the present disclosure, the memory may further store an instruction that causes the processor to increase a dwell time for channels associated with the at least one second AP when a number of the at least one second AP is less than or equal to a designated value.

According to various embodiments of the present disclosure, in a non-transitory computer-readable recording medium having recorded thereon a program to be executed on a computer, the program includes executable instructions that cause, when executed by a processor, the processor to wirelessly connect to a first AP by using first credential information, to receive at a time point, a list of first channels at least partially associated with at least one second AP having a coverage overlapping that of the first AP among the plurality of APs, and to perform scanning with respect to the at least one second AP that uses the first credential information by using the list of the first channels, in which the list of the first channels includes, but not all, a plurality of channels among channels available from the wireless protocol.

According to various embodiments of the present disclosure, the program may include an executable instruction that causes the processor further to wirelessly connect to one of the at least one second AP by using the first credential information.

According to various embodiments of the present disclosure, the program may include an executable instruction that causes the processor further to receive a list of third channels associated with at least one fourth AP having a coverage overlapping that of the wirelessly-connected AP among the plurality of APs and to update the list of the first channels by using the received list of the third channels.

According to various embodiments of the present disclosure, the program may include an executable instruction that causes the processor further to determine the complexities of the first channels associated with the at least one second AP and to adjust a dwell time for at least one channel determined to have a complexity that is greater than or equal to a designated seventh threshold value among the first channels, based on a result of the determination.

According to various embodiments of the present disclosure, an electronic device includes a housing and a wireless communication circuit located inside the housing and configured to support a wireless protocol as a first AP, in which the wireless communication circuit is configured to store a list of first channels associated with at least one other AP having a coverage overlapping that of the first AP, the list of the first channels including, but not all, a plurality of channels among channels available from the wireless protocol, to wirelessly connect to an external electronic device as the first AP by using first credential information, and to provide the list of the first channels to the external electronic device.

According to various embodiments of the present disclosure, the wireless communication circuit may be configured to store a list of second channels associated with at least one other AP that does not have a coverage overlapping that of the first AP and to further provide the list of the second channels to the external electronic device.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

According to various embodiments of the present disclosure, in a non-transitory computer-readable recording medium having recorded thereon a program to be executed on a computer, the program includes executable instructions that cause, when executed by a processor, the processor to wirelessly connect to a first AP by using first credential information, to receive at a time point, a list of first channels at least partially associated with at least one second AP having a coverage overlapping that of the first AP among the plurality of APs, and to perform scanning with respect to the at least one second AP that uses the first credential information by using the list of the first channels, in which the list of the first channels includes, but not all, a plurality of channels among channels available from the wireless protocol.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
 a housing;
 a wireless communication circuit located inside the housing and configured to support a wireless protocol for a wireless connection, at a time point, with one of a plurality of access points (APs) that use identical first credential information, wherein the wireless protocol comprises a Wireless Fidelity (WiFi) protocol and the first credential information comprises a service set identifier (SSID);
 a processor located inside the housing and electrically connected with the wireless communication circuit; and
 a memory located inside the housing and electrically connected with the processor,
 wherein the memory stores instructions that are configured to cause, when executed, the processor to:
 wirelessly connect to a first AP by using the first credential information, through the wireless communication circuit;
 receive, from the first AP, a list of first channels at least partially associated with at least one second AP having a coverage overlapping a coverage of the first AP and a list of second channels associated with at least one third AP that does not have a coverage overlapping the coverage of the first AP through the wireless communication circuit, wherein the first AP, the at least one second AP, and the at least one third AP use the identical first credential information;
 increase a dwell time for each of the first channels at least partially associated with the at least one second AP, if a number of the at least one second AP is less than or equal to a designated value; and
 based on the increased dwell time for each of the first channels, perform scanning with respect to the at least one second AP by using the list of the first channels, through the wireless communication circuit,
 wherein the list of the first channels comprises, but not all, a plurality of channels among channels available from the wireless protocol.

2. The electronic device of claim 1, wherein the instructions are configured to cause the processor to perform scanning with respect to the at least one second AP by using the list of the first channels, through the wireless communication circuit, when a received signal strength indication (RSSI) value for the first AP is less than or equal to a designated first threshold value or when the RSSI value for the first AP exceeds the first threshold value and is less than or equal to a designated second threshold value and a channel utilization (CU) value for the first AP is greater than or equal to a designated third threshold value.

3. The electronic device of claim 1, wherein the memory further stores instructions that are configured to cause the processor to perform scanning with respect to the at least one third AP by using the list of the second channels, through the wireless communication circuit.

4. The electronic device of claim 1, wherein the memory further stores instructions that are configured to cause the processor to wirelessly connect to one of the at least one second AP by using the first credential information through the wireless communication circuit, after performing scanning with respect to the at least one second AP.

5. The electronic device of claim 4, wherein the memory further stores instructions that are configured to cause the processor to:
 obtain at least one of an RSSI value or a CU value for each of the at least one second AP; and
 select an AP that is to be wirelessly connected from among the at least one second AP, by using the at least one of the RSSI value or CU value for each of the at least one second AP.

6. The electronic device of claim 4, wherein the memory further stores instructions that are configured to cause the processor to:
 receive a list of third channels associated with at least one fourth AP having a coverage overlapping a coverage of the wirelessly connected AP among the plurality of APs, through the wireless communication circuit; and
 update the list of the first channels by using the received list of the third channels.

7. The electronic device of claim 1, wherein the memory further stores instructions that are configured to cause the processor to:
 compare a CU value for the at least one second AP with a designated fourth threshold value;
 determine at least one AP with respect to which scanning is to be performed, among the at least one second AP, based on a result of the comparison; and
 perform scanning with respect to the determined at least one AP.

8. The electronic device of claim 1, wherein the memory further stores instructions that are configured to cause the processor to:
 determine levels of channel utilization of the first channels at least partially associated with the at least one second AP; and
 adjust a dwell time for at least one channel determined to have a level of channel utilization that is greater than or equal to a designated fifth threshold value among the first channels, based on a result of the determination.

9. The electronic device of claim 1, wherein the memory further stores instructions that are configured to cause the processor to:
- determine levels of channel utilization of the first channels at least partially associated with the at least one second AP; and
- perform additional scanning for at least one channel determined to have a level of channel utilization that is greater than or equal to a designated sixth value among the first channels, based on a result of the determination, after completing scanning for the first channels at least partially associated with the at least one second AP.

10. A non-transitory computer-readable recording medium including recorded thereon a program to be executed on a computer,
wherein the program comprises executable instructions that are configured to cause, when executed by a processor, the processor to:
- wirelessly connect to a first access point (AP) by using first credential information, through a wireless communication circuit electrically connected with the processor and configured to support a wireless protocol for a wireless connection with one of a plurality of access points (APs);
- receive, from the first AP, at a time point, a list of first channels at least partially associated with at least one second AP having a coverage overlapping a coverage of the first AP and a list of second channels associated with at least one third AP that does not have a coverage overlapping the coverage of the first AP, through the wireless communication circuit, wherein the first AP, the at least one second AP, and the at least one third AP use identical first credential information;
- increase a dwell time for each of the first channels at least partially associated with the at least one second AP, if a number of the at least one second AP is less than or equal to a designated value; and
- based on the increased dwell time for each of the first channels, perform scanning with respect to the at least one second AP by using the list of the first channels, wherein the list of the first channels comprises, but not all, a plurality of channels among channels available from the wireless protocol,
wherein the wireless protocol comprises a Wireless Fidelity (WiFi) protocol and the first credential information comprises a service set identifier (SSID).

11. The non-transitory computer-readable recording medium of claim 10, wherein the program comprises executable instructions that are configured to cause the processor further to wirelessly connect to one of the at least one second AP by using the first credential information.

12. The non-transitory computer-readable recording medium of claim 11, wherein the program comprises executable instructions that are configured to cause the processor further to:
- receive a list of third channels associated with at least one fourth AP having a coverage overlapping a coverage of the wirelessly connected AP among the plurality of APs; and
- update the list of the first channels by using the received list of the third channels.

13. The non-transitory computer-readable recording medium of claim 10, wherein the program comprises executable instructions that are configured to cause the processor further to:
- determine levels of channel utilization of the first channels at least partially associated with the at least one second AP; and
- adjust a dwell time for at least one channel determined to have a level of channel utilization that is greater than or equal to a designated seventh threshold value among the first channels, based on a result of the determination.

* * * * *